(12) United States Patent (10) Patent No.: US 8,078,962 B2
Aoki et al. (45) Date of Patent: Dec. 13, 2011

(54) APPARATUS AND METHOD FOR GENERATING WEB SITE NAVIGATIONS

(75) Inventors: Mihoko Aoki, Sagamihara (JP); Susumu Fukuda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 10/901,821

(22) Filed: Jul. 29, 2004

(65) Prior Publication Data

US 2005/0028089 A1 Feb. 3, 2005

(30) Foreign Application Priority Data

Jul. 31, 2003 (JP) ................................. 2003-284475

(51) Int. Cl.
*G06F 17/00* (2006.01)
(52) U.S. Cl. ......... 715/243; 715/222; 715/227; 715/235
(58) Field of Classification Search .................. 715/234, 715/235, 236
See application file for complete search history.

(56) References Cited

U.S. PATENT DOCUMENTS

| 6,035,330 | A | 3/2000 | Astiz et al. | |
|---|---|---|---|---|
| 6,792,475 | B1 * | 9/2004 | Arcuri et al. | 709/245 |
| 7,216,301 | B2 * | 5/2007 | Moehrle | 715/811 |
| 7,337,392 | B2 * | 2/2008 | Lue | 715/234 |
| 2002/0010715 | A1 * | 1/2002 | Chinn et al. | 707/514 |
| 2002/0120644 | A1 | 8/2002 | Roberts et al. | |
| 2003/0038836 | A1 * | 2/2003 | Ronald et al. | 345/738 |
| 2003/0172129 | A1 * | 9/2003 | Moses et al. | 709/219 |
| 2003/0229850 | A1 * | 12/2003 | Lue | 715/513 |
| 2005/0028081 | A1 * | 2/2005 | Arcuri et al. | 715/501.1 |
| 2007/0156677 | A1 * | 7/2007 | Szabo | 707/5 |
| 2008/0109472 | A1 * | 5/2008 | Underwood et al. | 707/102 |
| 2010/0325537 | A1 * | 12/2010 | Dayon | 715/255 |

FOREIGN PATENT DOCUMENTS

| EP | 0 802 491 A2 | 10/1997 |
|---|---|---|
| JP | 08-023318 | 7/1997 |
| JP | 12-259974 | 5/2001 |
| WO | WO 02/35335 A2 | 5/2002 |

OTHER PUBLICATIONS

Gloor, Peter A. "CYBEMAY Yet Another Way of Navigating in Hyperspace", Hypertext '19 Proceedings, pp. 107-121, Dec. 15-18, 1991.

(Continued)

*Primary Examiner* — Quoc A Tran
(74) *Attorney, Agent, or Firm* — Lee Law, PLLC; Christopher B. Lee

(57) ABSTRACT

To generate a navigation closed around a particular group of pages in a web site, there are provided a site structure storage means for storing information on a tree structure of a web site, a navigation root setting means or setting a particular web page as a navigation root, a page storage means for storing information on web pages, a navigation tag insertion means for inserting a navigation tag including level designation in a web page, a page selection means for selecting a page to be included in a navigation on the basis of a navigation root and level designation, a structure information generation means for generating structure information about a selected page, a template storage means for storing a template of a navigation and, a navigation generation means for generating a navigation on the basis of structure information, and a template.

18 Claims, 25 Drawing Sheets

```
                                                          ┌─ 1100
<? xml version "1.0" encoding="UTF -8" ?>
- < website verions =" 510 ">
  - < structure >
    - < page src =" /WebContent/newpage.html" id =" 1 ">
      < title > newpage </ title>
      - < page src ="/WebContent/newpage2.html" id =" 2 " navroot =" true ">
        < title > newpage2 </ title>
        - < page src =" /WebContent/newpage4.html" id = " 4 ">
          < title > newpage4 </ title >
        </ page >
        - < page src =" /WebContent/newpage5.html" id =" 5 ">
          < title > newpage5 </ title >
        </ page >
      </ page >
      - < page src =" /WebContent/newpage3.html" id = " 3 "> navroot =" true ">
        < title > newpage3 </ title >
        - < page src > =" /WebContent/newpage6.html" id =" 6 ">
          < title > newpage6 </ title >
        </ page >
        - < page src =" /WebContent/newpage7/html" id =" 7 ">
          < title > newpage7 </ title >
        </ page>
      </ page >
    </ page >
  </ structure >
</ website >
```

OTHER PUBLICATIONS

"Increasing the Flexibility of the Hyperlink Selection of the Navigation in a Web Page", The 66th IPSJ National Convention Paper(1), Mar. 9, 2004, pp. 1-231 to 1-232.

Okazaki, "Comparison Site Software for Creating a Home Page," Jul. 15, 2003, 3 pages, Asahi PC No. 337.

Hisashi Shimamura, Hajime Takano, Tomonari Kamba, A Personalized Sitemap System for Navigation in Large WWW Sites, Journal: Joho Shori Gakkai Kenkyu Hokoku, Jan. 28, 2000, pp. 13-18, vol. 2000, No. 12, Information Processing Society of Japan, Tokyo, Japan.

Hisashi Shimamura, Hajime Takano, Tomonari Kamba, Abstract: A Personalized Sitemap System for Navigation in Large WWW Sites, Website/page: http://sciencelinks.jp/j-east/article/200011/000020001100A0258648.php, Printed from website on Mar. 22, 2010, p. 1, Japan Science and Technology Agency, Published on the World Wide Web.

* cited by examiner

FIG. 7

```
                                                              ┌─700
<? xml version "1.0" encoding="UTF  -8" ?>
- < website verions =" 510 ">
  - < structure >
    - < page src =" /WebContent/newpage.html" id =" 1 ">
      < title > newpage </ title>
      - < page src ="/WebContent/newpage2.html" id =" 2 ">
        < title > newpage2 </ title>
        - < page src =" /WebContent/newpage4.html" id = " 4 ">
          < title > newpage4 </ title >
        </ page >
        - < page src =" /WebContent/newpage5.html" id =" 5 ">
          < title > newpage5 </ title >
        </ page >
      </ page >
      - < page src =" /WebContent/newpage3.html" id = " 3 ">
        < title > newpage3 </ title >
        - < page src > =" /WebContent/newpage6.html" id =" 6 ">
          < title > newpage6 </ title >
        </ page >
        - < page src =" /WebContent/newpage7/html" id =" 7 ">
          < title > newpage7 </ title >
        </ page>
      </ page >
    </ page >
  </ structure >
</ website >
```

FIG. 9

```
                                                                    ┌─ 900
<? xml version "1.0" encoding="UTF  -8" ?>
- < website verions =" 510 ">
  - < structure >
    - < page src =" /WebContent/newpage.html" id =" 1 ">
      < title > newpage </ title>
      - < page src ="/WebContent/newpage2.html" id =" 2 " navroot =" true ">
        < title > newpage2 </ title>
        - < page src =" /WebContent/newpage4.html" id = " 4 ">
          < title > newpage4 </ title >
          </ page >
        - < page src =" /WebContent/newpage5.html" id =" 5 ">
          < title > newpage5 </ title >
          </ page >
        </ page >
        - < page src =" /WebContent/newpage3.html" id = " 3 ">
          < title > newpage3 </ title >
          - < page src > =" /WebContent/newpage6.html" id =" 6 ">
            < title > newpage6 </ title >
            </ page >
          - < page src =" /WebContent/newpage7/html" id =" 7 ">
            < title > newpage7 </ title >
            </ page>
          </ page >
        </ page >
    </ structure >
</ website >
```

FIG. 11

```xml
<? xml version "1.0" encoding="UTF -8" ?>
-< website verions =" 510 ">
  -< structure >
    -< page src =" /WebContent/newpage.html" id =" 1 ">
      < title > newpage </ title>
      -< page src ="/WebContent/newpage2.html" id =" 2 " navroot =" true ">
        < title > newpage2 </ title>
        -< page src =" /WebContent/newpage4.html" id = " 4 ">
          < title > newpage4 </ title >
        </ page >
        -< page src =" /WebContent/newpage5.html" id =" 5 ">
          < title > newpage5 </ title >
        </ page >
      </ page >
      -< page src =" /WebContent/newpage3.html" id = " 3 "> navroot =" true ">
        < title > newpage3 </ title >
        -< page src > =" /WebContent/newpage6.html" id =" 6 ">
          < title > newpage6 </ title >
        </ page >
        -< page src =" /WebContent/newpage7/html" id =" 7 ">
          < title > newpage7 </ title >
        </ page>
      </ page >
    </ page >
  </ structure >
</ website >
```

```
<!DOCTYPE HTML PUBLIC "-//W3C//DTD HTML 4.01 Transitional//EN">
<HTML>
<HEAD>
<META http-equiv="Content-Type" content="text/html; charset=SHIFT=JIS">
<META name="GENERATOR" content="IBM Websphere Studio">
<META http-equiv="Content-Style-Type" content="text/css">
<LINK href="theme/Master.css" rel="stylesheet" type="text/css">
<TITLE>newpage2.html</TITLE>
</HEAD>
<BODY>
<!-- siteedit:navbar targetlevel="1-3" spec="sitemap_veritcal.html" -->
<!-- /siteedit:navbar -->
</BODY>
</HTML>
```
⌐1400

FIG. 16

```
<HTML>
<HEAD>
<TITLE>sitemap_vertical</TITLE>
<LINK href="theme/Master.css" rel="stylesheet" type="text/css">
</HEAD>
<BODY>
<table border="0" cellspacing="0" cellpadding="5">
<tbody>
<!--siteedit:forEach var="item' items="${sitenav.items}"-->
<!--siteedit:choose-->
<!--siteedit:when test="${item.self && item.level == 0}"-->
    <tr>
     <td bgcolor="#ffffff">
       <B><A href="${item.href}">${item.label}</A></B>
     </td>
    </tr>
<!--/siteedit:when-->
<!--siteedit:when test="${item.level == 0}"-->
    <tr>
     <td bgcolor="#99ccff">
       <B><a href="${item.href}">${item.label}</a></B>
     </td>
    </tr>
<!--/siteedit:when-->
<!--siteedit:when test="${item.self}"-->
    <tr>
     <td bgcolor="#ffffff">
        <a href="${item.href}">${item.label}</a>
     </td>
    </tr>
<!--/siteedit:when-->
<!--siteedit:otherwise-->
    <tr>
     <td bgcolor="#99ccff">
       <a href=${item.href}">${item.label}</a>
     </td>
    </tr>
<!--/siteedit:otherwise-->
<!--/siteedit:choose-->
<!--/siteedit:forEach-->
</tbody>
</table>
</BODY>
</HTML>
```

FIG. 17

```
                                                                    ┌─1700
<!DOCTYPE HTML PUBLIC "-//W3C//DTD HTML 4.01 Transitional//EN">
<HTML>
<HEAD>
<META http-equiv="Content-Type" content="text/html; charset=SHIFT=JIS">
<META name="GENERATOR" content="IBM Websphere Studio">
<META http-equiv="Content-Style-Type" content="text/css">
<LINK href="theme/Master.css" rel="stylesheet" type="text/css">
<TITLE>newpage2.html</TITLE>
</HEAD>
<BODY>
<!-- siteedit:navbar targetlevel="1-3" spec="sitemap_veritcal.html" -->
<table border="0" cellspacing="0" cellpadding="5">
   <tbody>
      <tr>
        <td bgcolor=#ffffff>
           <B><A href="/project/newpage3.html">newpage2</A></B>
        </td>
      </tr>
      <tr>
        <td bgcolor="#99ccff">
           <a href="/project/newpage4.html">newpage4</a>
        </td>
      </tr>
      <tr>
        <td bgcolor="#99ccff">
           <a href=/project/newpage5.html">newpage5</a>
        </td>
      </tr>
   </tbody>
</table>
<!--/siteedit:navbar -->
</BODY>
</HTML>
```

FIG. 20

```
      <HTML>
      <HEAD>
      <TITLE>sitemap</TITLE>
      <LINK href="theme/Master.css" rel="stylesheet" type="text/css">
      </HEAD>
      <BODY>
2001  <!--siteedit:forEach var="top" items'"${sitenav.tops}">
2002  <table border="1">
2003  <tbody>
          <tr>
            <td valign="top" align="center" colspan="${top.childcount}">
2004        <a href="${top.item.href}">${top.item.label}</a>
            </td>
          </tr>
2005      <tr>
2006  <!--/siteedit:forEach var="node" items="${top.children}"-->
2007      <td valign="top">
2008        <a href="${node.item.href}">${node.item.label}</a>
2009  <!--siteedit:if test="${0 < node.childcount}"-->
          <ul>
2010  <!--siteedit:forEach var="nodes" items="${node.children}"-->
2011          <li><a href="${node2.item.href}">${node2.item.label}</a></li>
2012  <!--/siteedit:forEach-->
2013      </ul>
2014  <!--/siteedit:if-->
2015      </td>
2016  <!--/siteedit:forEach-->
2017      </tr>
      </tbody>
2018  </table>
2019  <!--/siteedit:forEach-->
2020  </BODY>
2021  </HTML>
```

```html
<!DOCTYPE HTML PUBLIC "-//W3C//DTD HTML 4.01 Transitional//EN">
<HTML>
<HEAD>
<META http-equiv="Content-Type" content="text/html; charset=SHIFT=JIS">
<META name="GENERATOR" content="IBM Websphere Studio">
<META http-equiv="Content-Style-Type" content="text/css">
<LINK href="theme/Master.css" rel="stylesheet" type="text/css">
<TITLE>newpage.html</TITLE>
</HEAD>
<BODY>
<!-- siteedit:navbar targetlevel="1-3" spec="sitemap.html" -->
<table border="1">
   <tbody>
     <tr>
       <td valign="top" align="center" colspan="2">
         <a href="/project/newpage.html">newpage</a>
       </td>
     </tr>
     <tr>
       <td valign="top">
         <a href="/project/newpage2.html">newpage2</a>
         <ul>
           <li><a href="/project/newpage4.html">newpage4</a></li>
           <li><a href="/project/newpage5.html">newpage5</a></li>
         </ul>
       </td>
       <td valign="top">
         <a href="/project/newpage3.html">newpage3(/a>
         <ul>
           <li><a href="/project/newpage6.html">newpage6</a></li>
           <li><a href="/project/newpage7.html">newpage7</a></li>
         </ul>
       </td>
     </tr>
   </tbody>
</table>
<!--/siteedit:navbar -->
</BODY>
</HTML>
``` ions on all the web pages. However, links to the web pages
APPARATUS AND METHOD FOR GENERATING WEB SITE NAVIGATIONS

FIELD OF THE INVENTION

The present invention pertains to the field of generating a navigation displayed on a web page. More particularly, the invention pertains to a navigation generation apparatus and method which generates a navigation including a link to a web page contained in a partial tree forming a portion of a tree structure of a web site.

BACKGROUND

In this specification, a "navigation" is a set of information displayed on a web page for the purpose of helping a user to move to a target web page and to know the relative position of the current web page within a web site. The set of information may include hyperlinks to other web pages (hereinafter referred to simply as "links").

Some existing program products for generating web pages provide a function to create navigations to be displayed on web pages. For example, a way of displaying a navigation on a web page is given in Japanese Published Unexamined Patent Application No. 10-149372. Such products implement, as a method for selecting links to be included in a navigation, a first method in which links to all web pages included in a target web site are selected, and a second method in which links to such web pages that have been designated based on relative relationships with a target web page (for example, a parent page, a child page, and so forth) are selected. Significant problems arise, however, when using either of these methods on large-scale web sites.

A large-scale web site may include a plurality of groups of web pages having different themes, e.g., a group of web pages relating to a product A and a group of web pages relating to a product B, although the groups of web pages are linked to a common top page. When making a navigation for such a web site, links to the web pages relating to product A and links to the web pages relating to product B are included in navigations on all the web pages. However, links to the web pages relating to the product B should be excluded from navigations on the web pages relating to the product A, and links to the web pages relating to the product A should be excluded from navigations on the web pages relating to the product B. The first method, however, cannot provide these kinds of exclusions.

Although the exclusions may be provided by using the second method, another problem arises. That is, in a case where navigations are made by using templates in which styles are defined according to relative relationships, they are displayed in the different styles related to the web pages on which they are displayed, even if they are made for links to one web page.

For example, let's assume a case in which display of a link to a parent page of a web page on which a navigation is displayed is defined in a style A, display of a link just to the web page on which the navigation is displayed or a link to a web page which is a sibling page of the web page on which the navigation is displayed is defined in style B, and display of a link to a child page of the web page on which the navigation is displayed is defined in a style C, and in which a child page of "1.htm" in one web site is "2.htm," a child page of "2.htm" is "3.htm," a child page of "3.htm" is "4.htm," and a child page of "4.htm" is "5.htm." In this case, when navigations are made on "2.htm," "3.htm," and "4.htm," a link to "3.htm" in the navigation on "2.htm" is displayed in the style C, a link to "3.htm" in the navigation on "3.htm" is displayed in the style B, and a link to "3.htm" in the navigation on "4.htm" is displayed in the style A. That is, the links are displayed in different styles corresponding to the pages on which they are displayed, although they connect to the same page "3.htm." In this case, a navigation that is easy to understand is not provided when users go from one web page to another, and return.

The present invention solves the above-described technical problems; an object of the present invention is to enable generation of an easy-to-understand navigation closed around a particular group of web pages in a web site.

SUMMARY

A navigation generation apparatus in accordance with the present invention has page selection means for selecting at least one web page contained in a predetermined partial tree forming a portion of a tree structure of a web site, and navigation generation means for generating a navigation including a link to the web page selected by the page selection means and information indicating the position of the web page in the predetermined partial tree. The navigation generation means determines a style for the link to the selected web page as a style according to the position of the web page in the predetermined partial tree by using a template in which the style according to the position in the partial tree is defined.

The present invention also includes an information management apparatus which makes a setting for generating a navigation. This information management apparatus of the present invention has receiving means for receiving designation of a particular web page contained in a web site, and setting means for making a setting for generation of a navigation including at least one link to a web page contained in a partial tree having as a root the web page the designation of which has been received by the receiving means.

Further, the present invention also includes a method for navigation generation apparatus. This navigation generation method of the present invention includes a step of selecting at least one web page contained in a predetermined partial tree forming a portion of a tree structure of a web site on the basis of information on the tree structure stored in a predetermined storage, and a step of outputting to the predetermined storage a navigation including a link to the selected web page and information indicating the position of the web page in the predetermined partial tree. The step of outputting the navigation includes determining a style for the link to the selected web page as a style according to the position of the web page in the predetermined partial tree by using a template in which the style according to the position in the partial tree is defined.

Further, the present invention also includes a method for an information management apparatus which makes a setting for generating a navigation. This site structure management method of the present invention includes a step of receiving designation of a particular web page contained in a web site, and a step of making, based on information on a tree structure of the web site stored in a predetermined storage, a setting for generation of a navigation including at least one link to a web page contained in a partial tree having the designated particular web page as a root.

The present invention also includes storage medium having a computer program for enabling a computer to perform the function of generating a navigation. This computer program of the present invention enables a computer to perform the function of selecting at least one web page contained in a predetermined partial tree forming a portion of a tree structure of a web site, and the function of generating a navigation including a link to the selected web page and information indicating the position of the web page in the predetermined partial tree. The function of generating the navigation includes determining a style for the link to the selected web page as a style according to the position of the web page in the predetermined partial tree by using a template in which the style according to the position in the partial tree is defined.

Further, the present invention also includes a computer program for enabling a computer to perform the function of making a setting for generation of a navigation. This computer program of the present invention enables a computer to perform the function of receiving designation of a particular web page contained in a web site, and the function of making a setting for generation of a navigation including at least one link to a web page contained in a partial tree having the designated particular web page as a root.

BRIEF DESCRIPTION OF THE DRAWINGS

An exemplary embodiment of the present invention will be described in detail with reference to the accompanying drawings, in which:

FIG. 7 is a diagram showing site structure information representing the site structure used in the exemplary embodiment;

FIG. 9 is a diagram showing site structure information representing the site structure used in the exemplary embodiment;

FIG. 11 is a diagram showing site structure information representing the site structure used in the exemplary embodiment;

FIG. 14 is a diagram showing an example of a page description after insertion of a navigation tag in the exemplary embodiment;

FIG. 16 is a diagram showing an example of a template in the exemplary embodiment;

FIG. 17 is a diagram showing an example of a page description after insertion of a navigation in the exemplary embodiment;

FIG. 20 is a diagram showing an example of a template in the exemplary embodiment;

FIG. 21 is a diagram showing an example of a page description after insertion of a navigation tag in the exemplary embodiment;

DETAILED DESCRIPTION

The configuration of a navigation generation apparatus in this exemplary embodiment will first be described. Herein below, a "web page" is referred to simply as "page."

Figure 1:
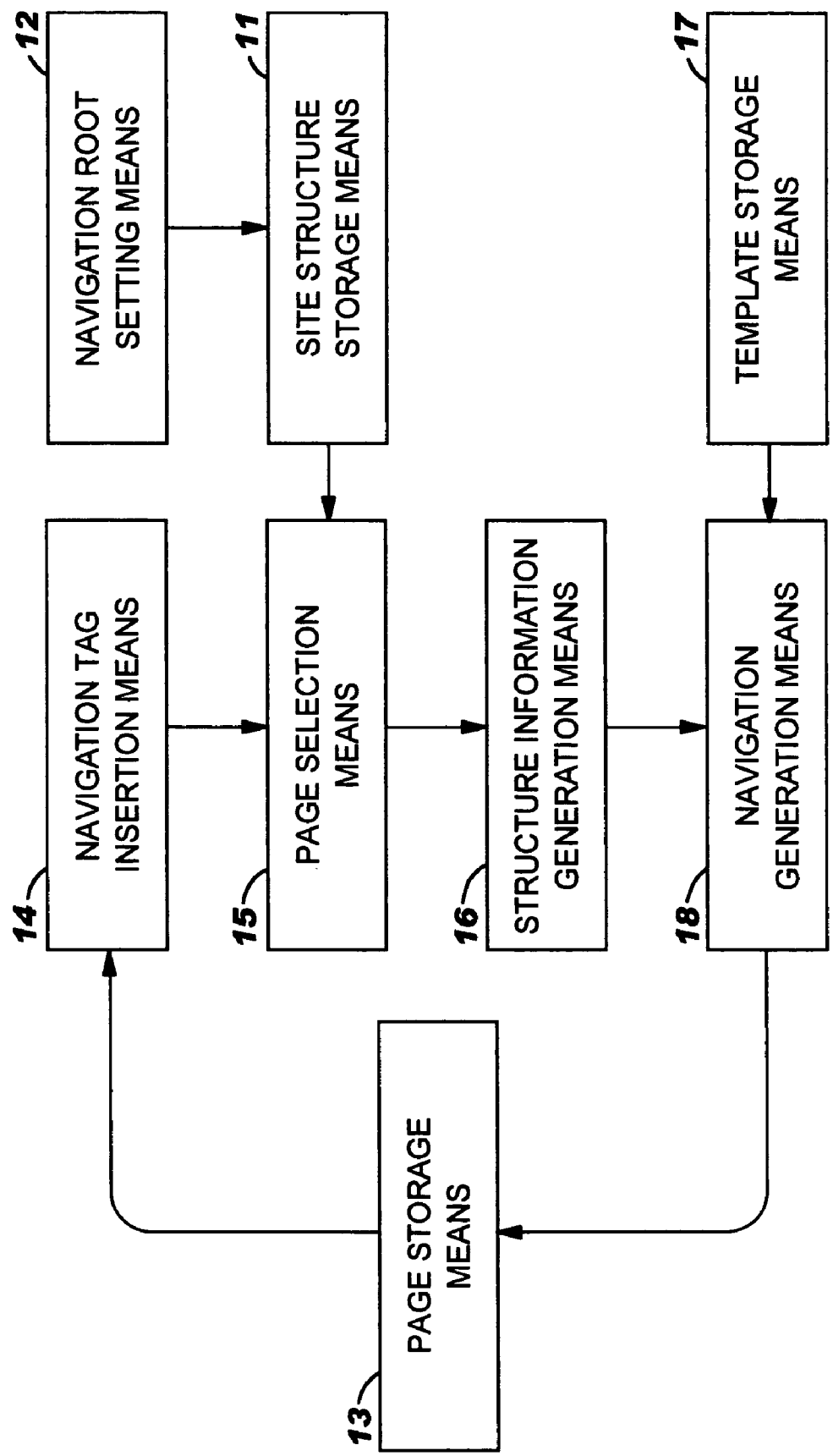
FIG. 1 is a block diagram showing an exemplary configuration of a navigation generation apparatus in an exemplary embodiment of the present invention.

FIG. 1 is a diagram showing an exemplary configuration of the navigation generation apparatus in an exemplary embodiment. As shown in FIG. 1, this navigation generation apparatus has a site structure storage means 11, a navigation root setting means 12, a page storage means 13, a navigation tag insertion means 14, a page selection means 15, a structure information generation means 16, a template storage means 17, and a navigation generation means 18.

The site structure storage means 11 is a means for storing information on the site structure of a web site (hereinafter referred to as "site structure information"). A web site generally has a tree structure which has a top page as a root and end pages as leaves, and in which each of pages through which one of the leaves is traced from the root is a node. The site structure information is expressed as a method suitable for representation of the tree structure.

In this embodiment, a level is defined with respect to each of web pages contained in a web site (which level will hereinafter be referred to as "level in site structure"). More specifically, the level is defined in such a manner that the level of the top page is 1, the level of a child page of the top page is 2, and the level of a child page of this child page of the top page is 3. The numerical value representing the level increases in the direction from the root to leaves.

The navigation root setting means 12 is a means for setting as a navigation root a specific page contained in the site structure information stored in the site structure storage means 11. More specifically, the navigation root setting means 12 includes receiving means for receiving designation of a specific page and setting means for setting the received page as a navigation root. Setting by the setting means is not limited to the case of setting a page as a navigation root. Rather, setting by the setting means may also include setting for generation of a navigation including a link to a web page contained in a partial tree having the specific page as its root.

A "navigation root" is a page which is a base point for a navigation. The tree structure of a web site can be divided into several smaller partial trees. If a certain page is set as a navigation root in a navigation, each of pages forming a particular partial tree having the page as its root are included in the navigation.

In this embodiment, a level is defined with respect to each of pages included in a navigation (which level will hereinafter be referred to as "level in navigation"). More specifically, the level is defined in such a manner that the level of a navigation root is 1, the level of a child page of the navigation root is 2, and the level of a child page of this child page of the navigation root is 3. The numerical value representing the level increases in the direction from the navigation root to leaves.

The page storage means 13 is a means for storing a description of each of pages (HTML files or the like) included in a web site.

The navigation tag insertion means 14 is a means for inserting a navigation tag in page descriptions stored in the page storage means 13.

The page selection means 15 is a means for selecting pages to be included in a navigation from the pages contained in the site structure information stored in the site structure storage means 11.

The structure information generation means 16 is a means for generating structure information including labels for pages selected by the page selection means 15, paths related to the selected pages, the relationships between the selected pages and other pages, and the like.

The template storage means 17 is a means for storing templates in which styles of navigation are defined. Templates provided by an application program or templates originally formed by a user may be used as the templates stored in the template storage means 17.

The navigation generation means 18 is a means for generating a navigation based on the structure information generated by the structure information generation means 16 and the templates stored in the template storage means 17.

An ordinary computer system may be used as the hardware configuration of the navigation generation apparatus in this embodiment. That is, a hardware configuration may suffice which includes a central processing unit (CPU) and a main memory, and in which the CPU and the main memory are connected to an auxiliary storage via a bus. The auxiliary storage may be a hard disk, a flexible disk, an MO (magneto optical disk), a CD-ROM, or the like.

A computer program for implementation of this embodiment may be stored in the auxiliary storage. The central processing unit (CPU) reads this computer program to the main memory and executes this computer program to realize each of the navigation root setting means 12, the navigation tag insertion means 14, the page selection means 15, the structure information generation means 16, and the navigation generation means 18. The functions of controlling input/output to or from the storage area in each of the site structure storage means 11, the page storage means 13, and the template storage means 17 may be realized by a similar operation.

The storage area function of each of the site structure storage means 11, the page storage means 13, and the template storage means 17 may be realized by using the auxiliary storage or the main memory. Data to be stored in each of these storage means may be provided by being downloaded via a communication network such as the Internet.

Input devices such as a keyboard and a pointing device may be connected to the navigation generation apparatus, and an output device such as a display may be connected to the navigation generation apparatus. Further, a configuration may alternatively be adopted in which terminal devices functioning as an input device and an output device are provided separately from the navigation generation apparatus and connections are made between these devices and apparatus via a communication line.

In any of such configurations, functions not shown in FIG. 1 for realizing on the input device and the output device a user interface are required. Such functions are, for example, a function for displaying the tree structure of a web site in such a form that pages contained in the web site can be discriminated from each other and a function for displaying information on a web site in such a form that which one of pages contained in the web site is set as a navigation root can be grasped.

Figure 2:
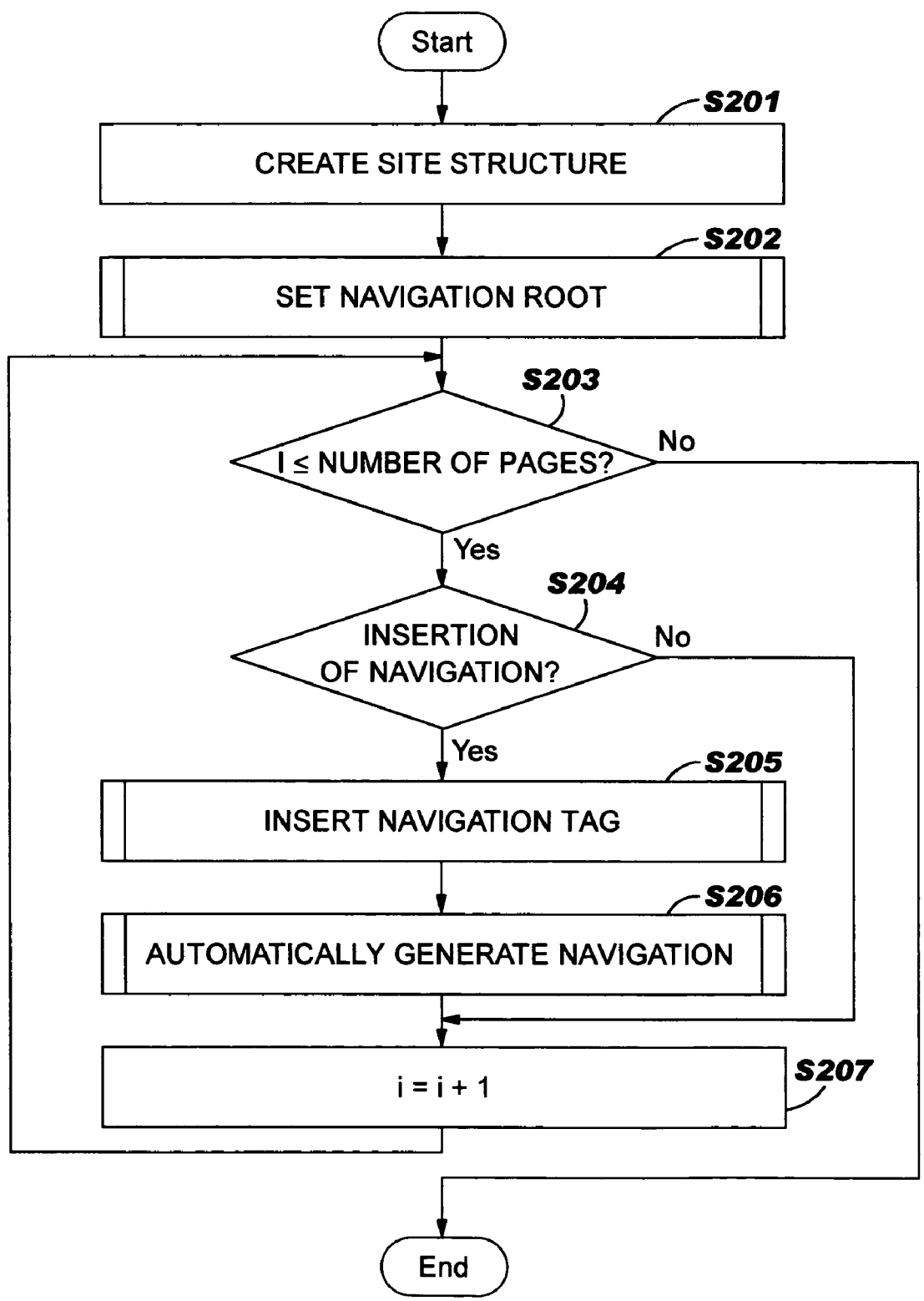
FIG. 2 is a flowchart showing an operating procedure for the navigation generation apparatus in the exemplary embodiment.

The operation of the navigation generation apparatus in this embodiment will now be described. FIG. 2 is a flowchart showing the flow of operations performed by a user on the navigation generation apparatus.

First, the user makes a site structure and stores site structure information on the site structure in the site structure storage means 11 (step 201). The user then uses the navigation root setting means 12 to set as one of the navigation roots a particular one of the pages contained in the site structure information stored in the site structure storage means 11 (step 202).

At this stage, the page storage means 13 maintains as its storage contents page descriptions of the pages contained in the site structure information stored in the site structure storage means 11. These page descriptions may be provided simultaneously with making of a site structure or at a time freely selected before or after the making of a site structure. After these preparations, the user performs operations to make a navigation to be displayed on a page.

The user first looks one of the pages stored in the page storage means 13. That is, if a number "i" represents an index to the pages, the user determines whether or not the number "i" is less than or equal to the number of pages contained in the site structure information (step 203).

If the number "i" is not less than or equal to the number of pages, the process ends. If the number "i" is less than or equal to the number of pages, the user determines whether or not a navigation should be inserted in the page (step 204). If the user wishes to insert a navigation in the page, the user inserts a navigation tag in the page by using the navigation tag insertion means 14 (step 205) and thereafter inputs an instruction to automatically generate a navigation (step 206).

If the page is not the one in which the user wishes to insert a navigation, or when the automatic making of a navigation is finished, the user looks the next one of the pages stored in the page storage means 13 and performs the same processing as that described above. That is, 1 is added to the number i (step 207) and the process returns to step 203. If the number i is less than or equal to the number of pages contained in the site structure information, processing in steps 204 to 206 is repeated.

The flow of user operations in this exemplary embodiment is as described above.

Operations specific to this embodiment in the processing operations of the software shown in FIG. 2 and started by a user's operation will be described in more detail. Navigation root setting processing in step 202 shown in FIG. 2 will first be described in detail.

Figure 3:
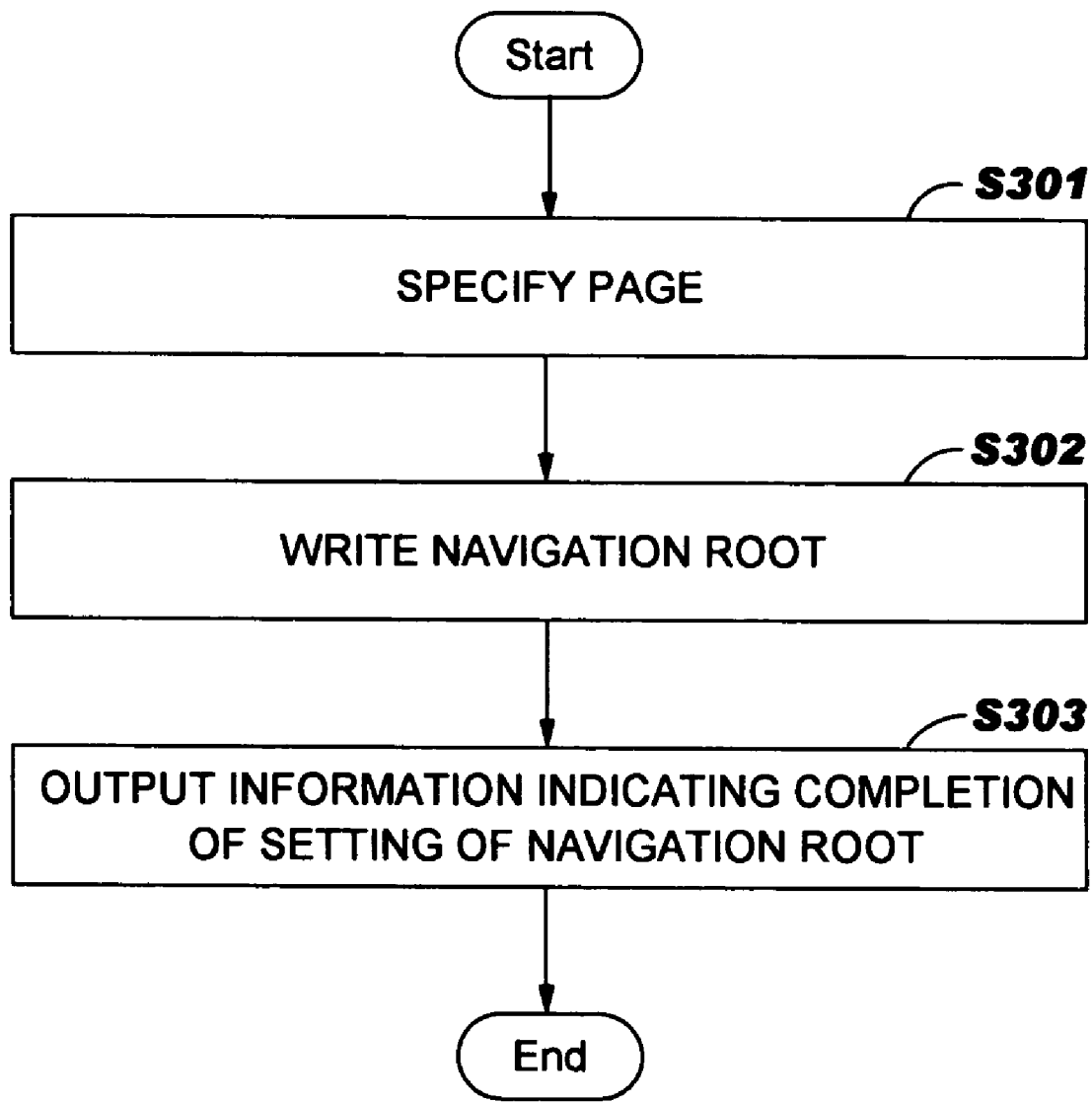
FIG. 3 is a flowchart showing navigation root setting processing in the operation of the exemplary embodiment.

FIG. 3 is a flowchart showing navigation root setting processing performed as the operation of the navigation root setting means 12. When an instruction is given to set as one of the navigation roots a particular one of the pages in the site structure information stored in the site structure storage means 11, the navigation root setting means 12 first identifies the page to be set (step 301). The navigation root setting means 12 then reads out the site structure information stored in the site structure storage means 11 adds information that the page is a navigation root as an attribute of a node of the page in the site structure information read out (step 302). The navigation root setting means 12 finally outputs information that the designated page has been set as a navigation root (step 303). Navigation root setting processing is thus performed by the navigation root setting means 12.

Figure 4:
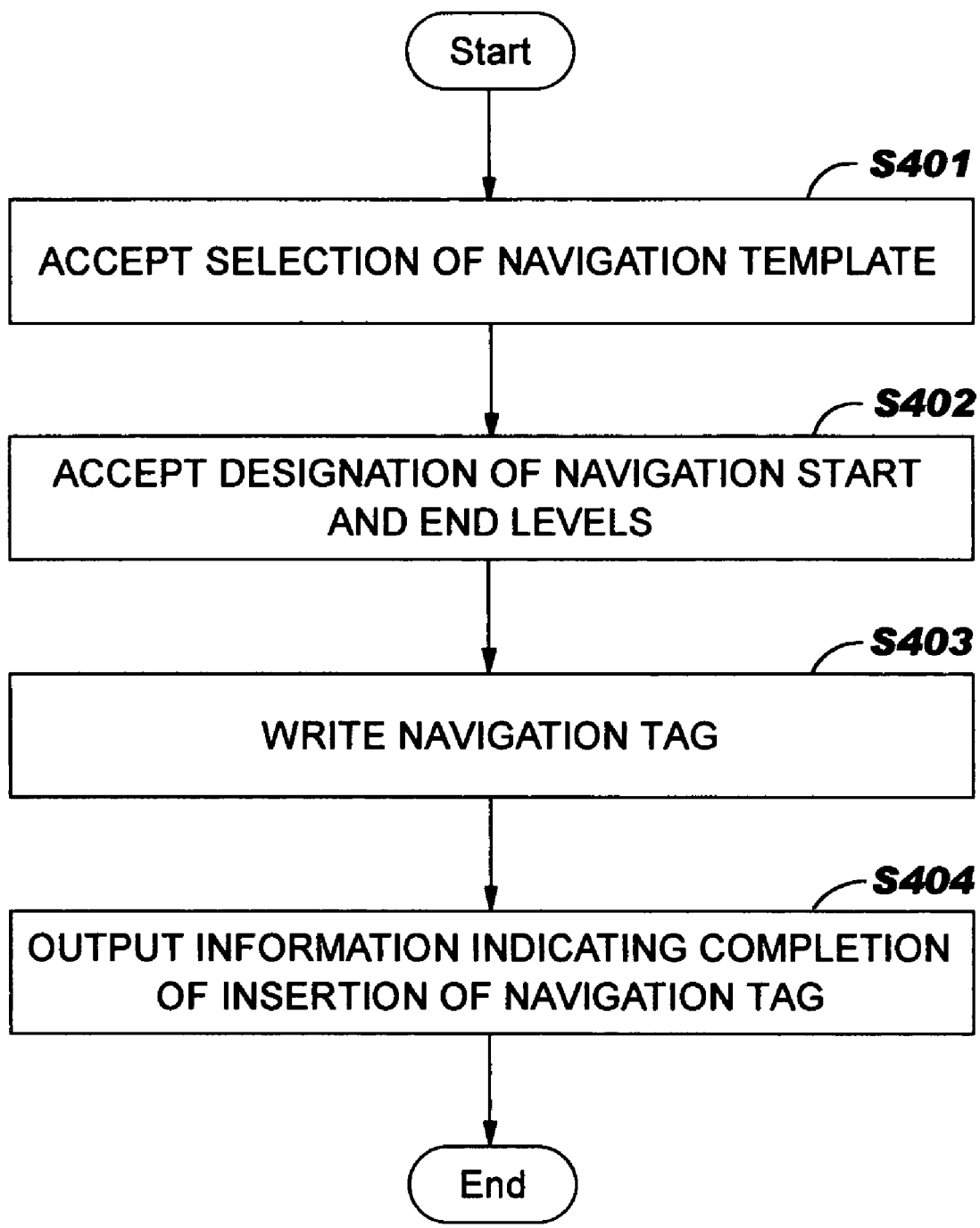
FIG. 4 is a flowchart showing navigation tag insertion processing in the operation of the exemplary embodiment.

Navigation tag insertion processing in step 205 shown in FIG. 2 will next be described in detail. FIG. 4 is a flowchart showing navigation tag insertion processing performed as the operation of the navigation tag insertion means 14.

The navigation tag insertion means 14 first reads and holds the page in which a navigation will be inserted in the pages stored in the page storage means 13. The navigation tag insertion means 14 also receives selection of a template used at the time of making of a navigation (step 401) and also receives designation of information for selecting pages to be included in the navigation, e.g., start and end levels indicating a range of page level (step 402). The navigation tag insertion means 14 writes, to the page read in advance, a navigation tag including information on the selected template and page selection information for selection from the pages (step 403). Finally, the navigation tag insertion means 14 outputs information that the navigation tag has been inserted (step 404).

Navigation tag insertion processing is thus performed by the navigation tag insertion means 14. Thereafter, when the user makes a request for saving the pages or an explicit request for automatic generation of the navigation, a transition of control to the page selection means 15 is made. At the time of this transition, the page in which the navigation tag is inserted is delivered from the navigation tag insertion means 14 to the page selection means 15.

Figure 5:
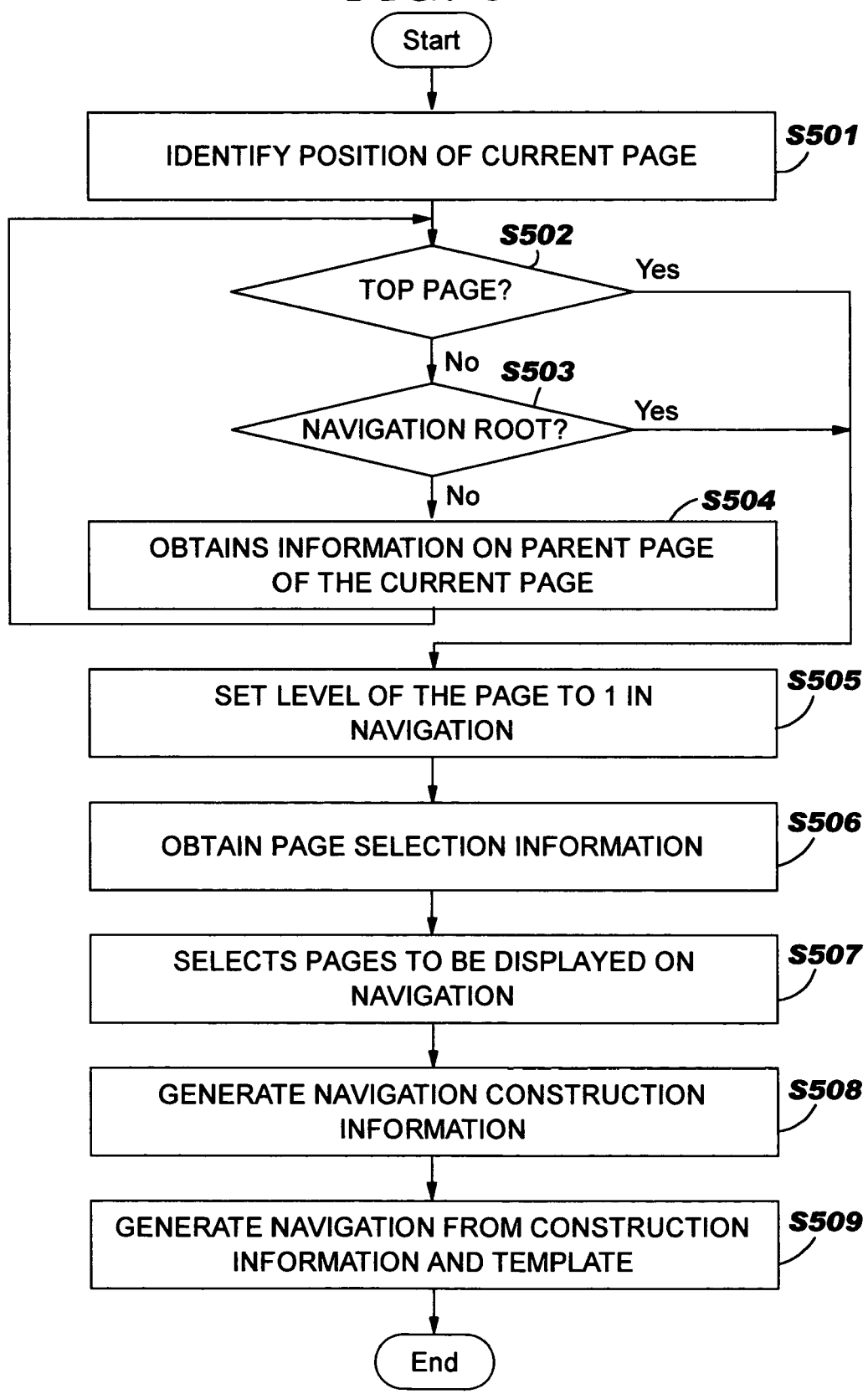
FIG. 5 is a flowchart showing automatic navigation generation processing in the operation of the exemplary embodiment.

Automatic navigation generation processing in step 206 shown in FIG. 2 will next be described in detail. FIG. 5 is a flowchart showing automatic navigation generation processing performed as the operations of the page selection means 15, the structure information generation means 16, and the navigation generation means 18. The page selection means 15 first reads and holds the site structure information stored in the site structure storage means 11, and identifies in the read site structure information the position of the page in which a navigation will be presently inserted (hereinafter referred as "current page") (step 501). The page selection means 15 then determines whether or not the page is a top page (step 502). If the page is a top page, the process proceeds to step 505. If the page is not a top page, the page selection means 15 then determines whether or not the page is a navigation root (step 503). If the page is a navigation root, the process proceeds to step 505. If the page is not a navigation root, the page selection means 15 obtains information about a parent page of the page (step 504) and the process returns to step 502. The page selection means 15 performs the same processing until the navigation root or the top page is reached.

When the navigation root or the top page is reached, the page selection means 15 sets the level of the page in the navigation to 1 (step 505).

Subsequently, the page selection means 15 refers to the page delivered from the navigation tag insertion means 14 and obtains the page selection information from the navigation tag written in the page (step 506). The page selection means 15 selects the pages to be included in the navigation on the basis of the information on the page the level of which has been set to 1 in the navigation in step 505, the page selection information about the page and the site structure information read in advance (step 507). For example, if the page selection information indicates a page level range, the page selection means 15 selects the pages corresponding to the level range from the base point, i.e., the navigation root.

Processing is thus performed by the page selection means 15, and a transition of control to the structure information generation means 16 is made. At the time of this transition, the identification information for determination of the selected pages, the page in which the navigation tag is inserted and the site structure information are delivered from the page selection means 15 to the structure information generation means 16.

The structure information generation means 16 extracts, from the site structure information delivered from the page selection means 15, portions for the pages corresponding to the identification information delivered from the page selection means 15, and generates navigation structure information (step 508). The structure information includes the labels and paths of the selected pages and the relationships of the selected pages with the other pages.

After the completion of this processing, a transition of control to the navigation generation means 18 is made. At the time of this transition, the structure information and the page in which the navigation tag is inserted are delivered from the structure information generation means 16 to the navigation generation means 18.

Finally, the navigation generation means 18 generates the navigation on the basis of the structure information delivered from the structure information generation means 16 and the template stored in the template storage means 17 (step 509). The navigation generation means 18 inserts the description of the navigation in the page delivered from the structure information generation means 16 and writes it back to the page storage means 13. Automatic navigation generation processing is thus performed.

Figure 6:
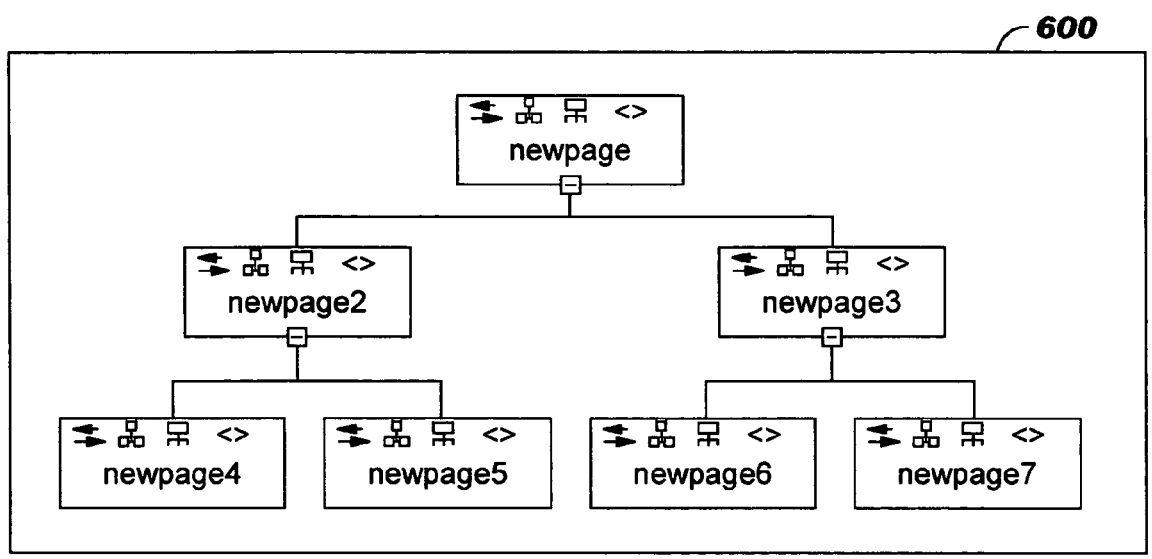
FIG. 6 is a diagram showing a site structure used in the exemplary embodiment.

The operation of this embodiment will be described in detail with respect to a particular example thereof. Description of the example will be made by assuming that a site structure 600 such as shown in FIG. 6 has been made (step 201). The site structure information corresponding to this structure is described, for example, in XML 700, as shown in FIG. 7. That is, site structure information such as shown in FIG. 7 is stored in the site structure storage means 11.

Processing performed by the navigation root setting means 12 to set a navigation root with respect to this site structure information will be described.

Figure 8:
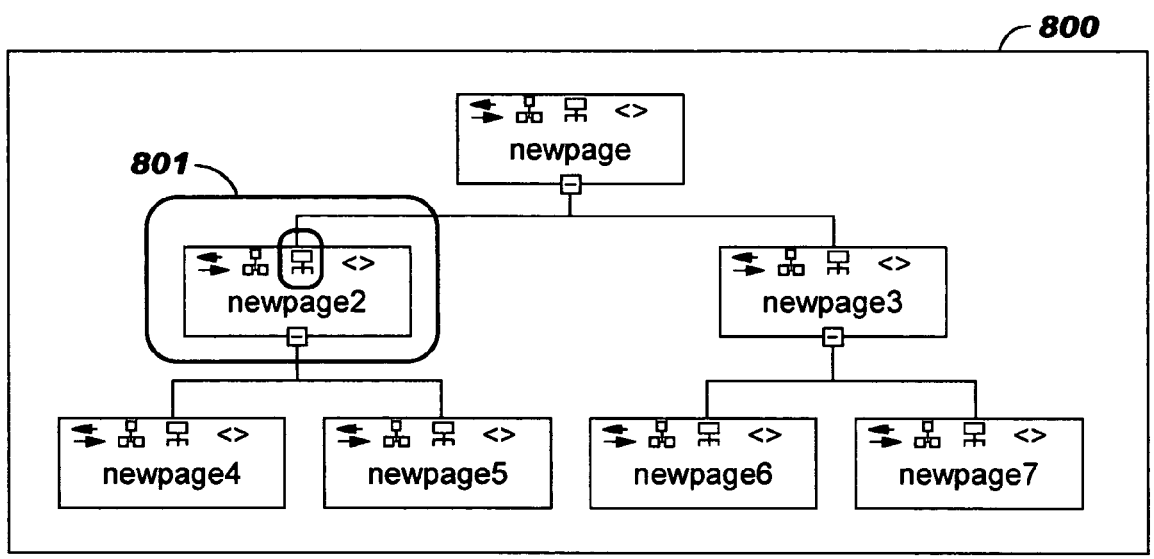
FIG. 8 is a diagram showing the site structure used in the exemplary embodiment.

As shown in FIG. 8, in a case where "newpage2" 801 in a site structure 800 is set as a navigation root, the navigation root setting means 12 identifies "newpage2" as a page to be set as a navigation root (step 301). Then, as shown by XML 900 in FIG. 9, the navigation root setting means 12 adds a description indicating that "newpage2" is a navigation root to the description of "newpage2" in the site structure information (step 302). More specifically, the navigation root setting means 12 writes a description "navroot="true"" in a  tag corresponding to "newpage2." As shown in FIG. 8, the navigation root setting means 12 also displays an icon indicating that the "newpage2" is set as a navigation root in an object representing "newpage2" in the site structure displayed on a site editor (step 303).

Figure 10:
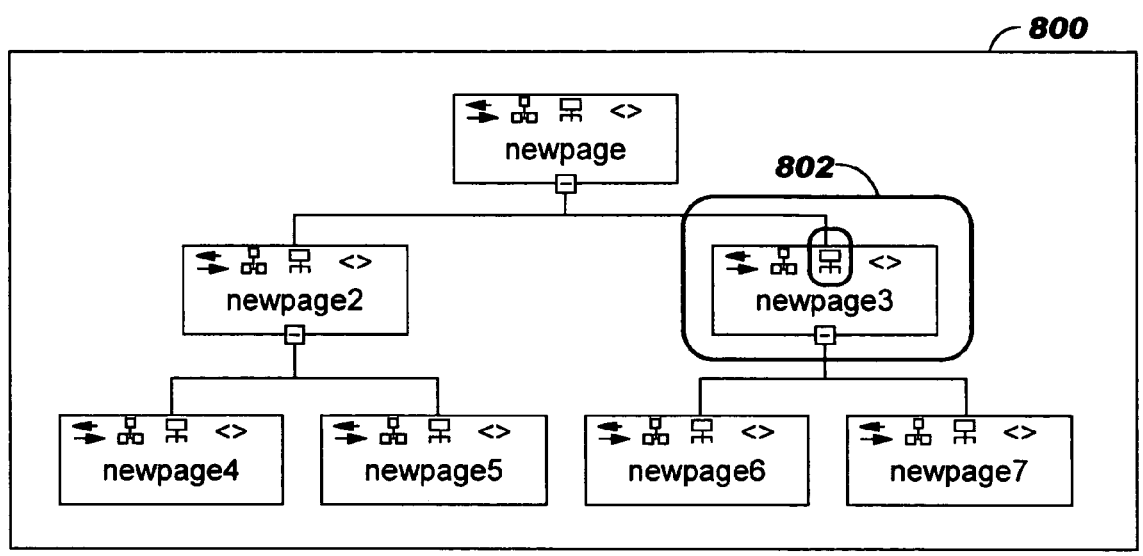
FIG. 10 is a diagram showing the site structure used in the exemplary embodiment.

Further, as shown in FIG. 10, in a case where "newpage3" 802 in the site structure 800 is also set as a navigation root, the navigation root setting means 12 identifies "newpage3" as a page to be set as a navigation root (step 301). Then, as shown in XML 1100 of FIG. 11, the navigation root setting means 12 adds a description indicating that "newpage3" is a navigation root to the description of "newpage3" in the site structure information (step 302). More specifically, the navigation root setting means 12 writes a description "navroot="true"" in a  tag corresponding to "newpage3." As shown in FIG. 10, the navigation root setting means 12 also displays an icon indicating that the "newpage3" is set as a navigation root in an object representing "newpage3" in the site structure displayed on the site editor (step 303).

Processing performed by the navigation tag insertion means 14 to insert a navigation tag in a page will next be described concretely. Description will be made with respect to a case where a navigation tag is inserted in "newpage2."

Figure 12:
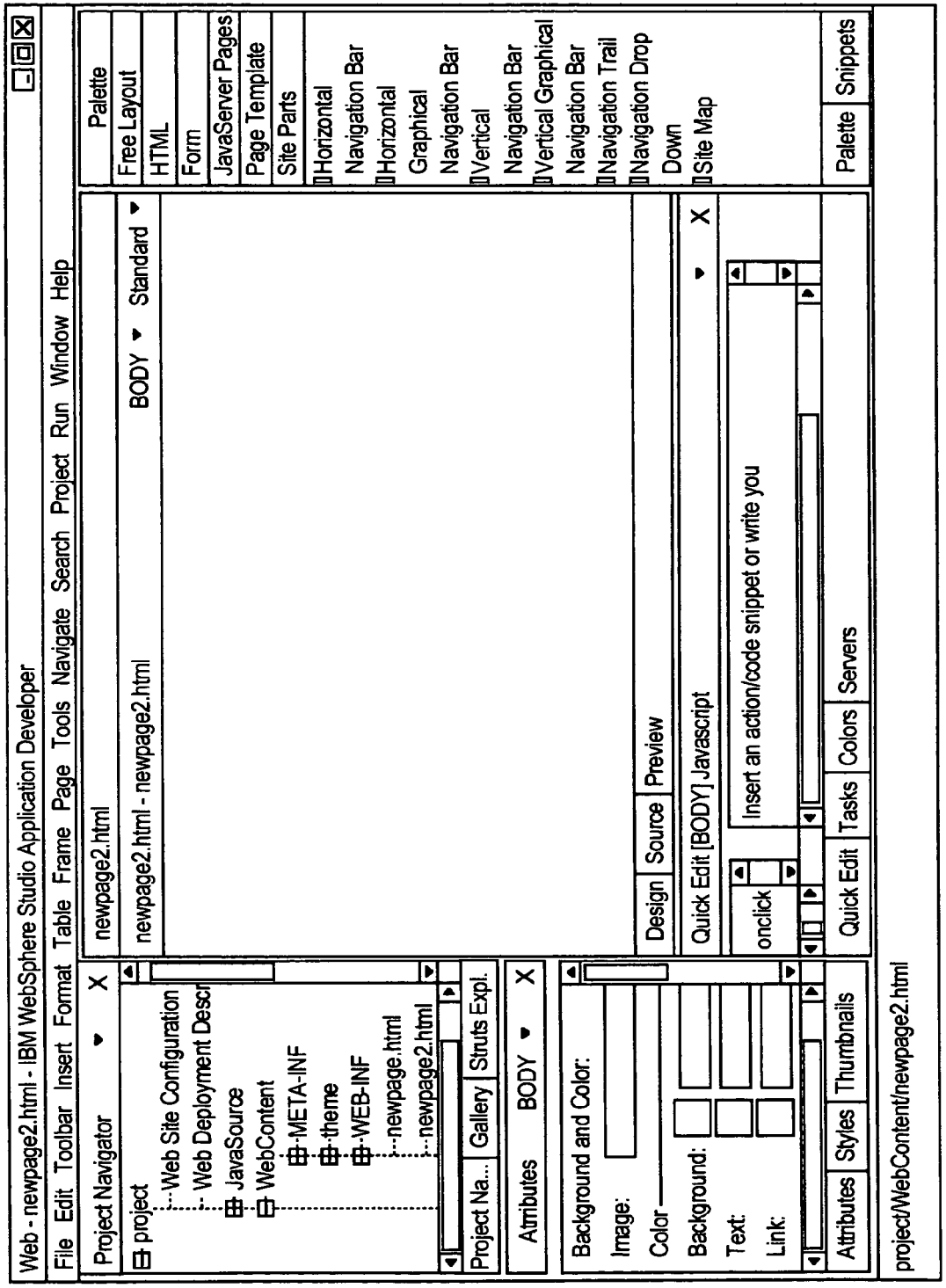
FIG. 12 is a diagram showing an example of an on-screen display on an editor in the exemplary embodiment.

An HTML file "newpage2.html" corresponding to "newpage2" is read. An on-screen display such as shown in FIG. 12 is produced in the editor. Referring to FIG. 12, nothing is described in the editing area for "newpage2.html." Subsequent operations may be performed after description of some text.

For example, referring to FIG. 12, an instruction to insert a navigation is input from "Insert" in the menu bar to hand over control to the navigation tag insertion means 14. The navigation tag insertion means 14 then displays a navigation tag insertion dialog such as shown in FIG. 13.

Figure 13:
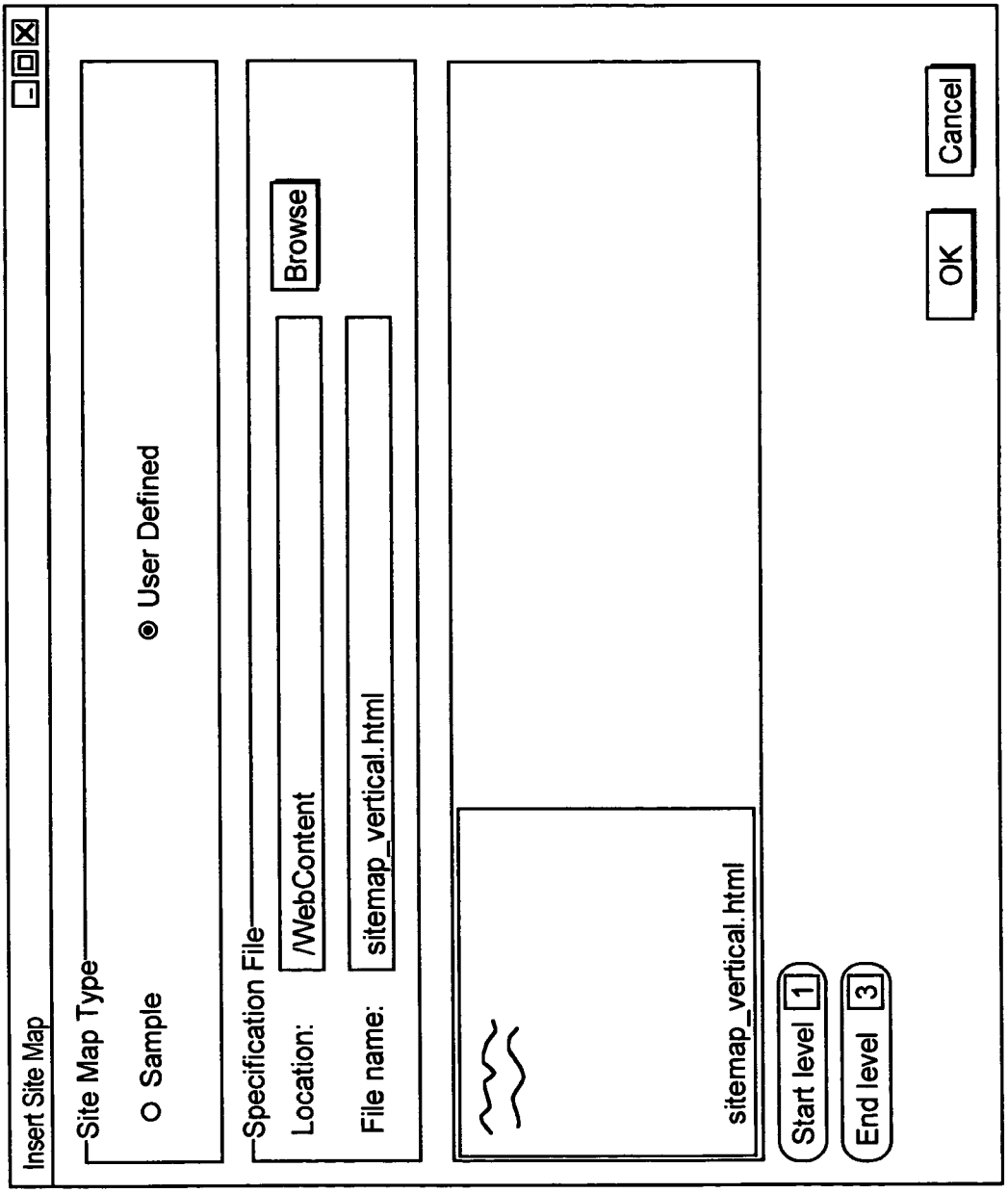
FIG. 13 is a diagram showing an example of a navigation tag insertion dialog in the exemplary embodiment.

In the navigation tag insertion dialog shown in FIG. 13, use of a sample or a user-defined template as a navigation template can be designated through a section "Site Map Type." When the user designates use of a user-defined template as shown in FIG. 13, a selectable template is displayed in a section "Thumbnail." In the dialog shown in FIG. 13, "sitemap_vertical.html" is previewed as a selectable template. While only one template is shown in this example, a plurality of selectable templates may exist and may be previewed.

When the user clicks the template that he or she wishes to use in displayed templates, the location and file name of the selected template are displayed in a section "Specification File." In this example, "sitemap_vertical.html" is selected as a template and, as a result of this selection, "/webContent" is displayed as a location and "sitemap_vertical.html" is displayed as a file name.

In the navigation tag insertion dialog, a range of levels can be designated in the navigation on the page as information for selecting pages to be included in the navigation. In this example, levels from "1" designated in a section "Start level" to "3" designated in a section "End level" are designated. While in this example a level range is designated as information for selecting pages to be included in the navigation, other various designation methods are conceivable. Other designation methods will be described in detail in the description of change of the navigation setting made below.

When an "OK" button is clicked after making the above-described setting, the navigation tag insertion means 14 accepts the information on the selected template (step 401) and accepts the information for selection of pages (step 402). The navigation tag insertion means 14 then writes a navigation tag to "newpage2.html" (step 403), as shown in code 1400 of FIG. 14. More specifically, the navigation tag includes "<!—siteedit:navbar . . . -->" indicating the beginning of the navigation tag, "targetlevel="1-3"" indicating the levels of pages included in the navigation, "spec="sitemap_vertical.html"" indicating the name of the HTML file used as the template for the navigation, and "<!--/siteedit:navbar-->" indicating the end of the navigation tag.

Figure 15:
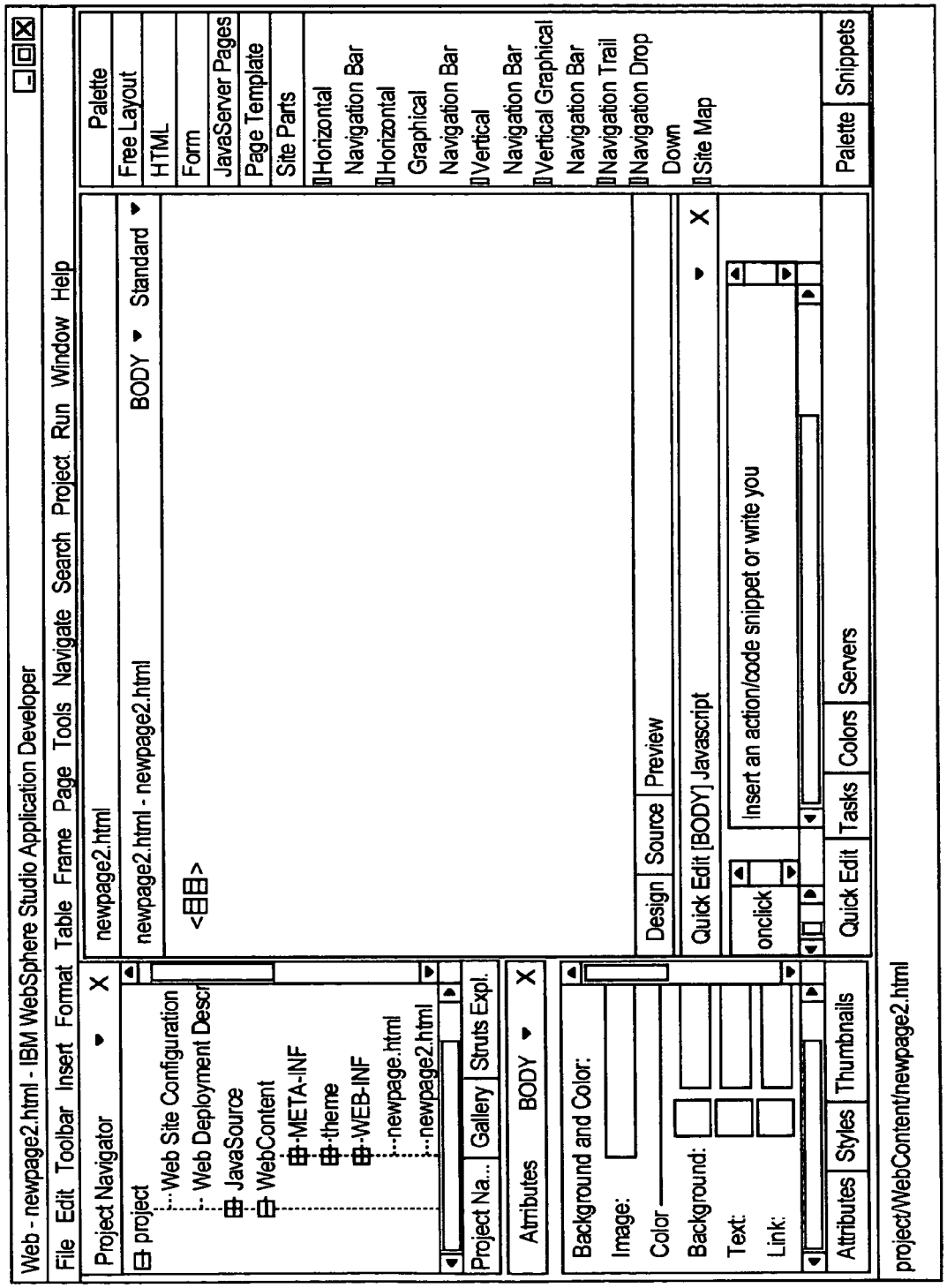
FIG. 15 is a diagram showing an example of an on-screen display on the editor in the exemplary embodiment.

At this time, an on-screen display such as shown in FIG. 15 is produced on the editor. That is, the navigation tag insertion means 14 displays in the editing area for "newpage2.html" an icon indicating that the navigation tag has been inserted (step 404). In this icon, the left half indicates the beginning of the navigation tag, while the right half indicates the end of the navigation tag. However, this icon is displayed only on the HTML editor and is not displayed when the HTML file is opened on a browser.

Automatic navigation making will next be described. The page selection means 15 first identifies the position of the current page by referring to the site structure information stored in the site structure storage means 11 (step 501). In this example, since the navigation will be inserted in the "newpage2", the page selection means 15 identifies the position of "newpage2." The page selection means 15 then determines whether or not "newpage2" is a top page (step 502). Since in this example "newpage2" is not a top page, the page selection means 15 then determines whether or not "newpage2" is a navigation root (step 503). Since in this example "newpage2" is a navigation root, the level of "newpage2" in the navigation is set to 1 (step 505). At this time, the levels of "newpage4" and "newpage5" which are child pages of "newpage2" are set to 2 in the navigation.

Subsequently, the page selection means 15 obtains page selection information from the navigation tag written in the page delivered from the navigation tag insertion means 14 (step 506). More specifically, the page selection means 15 obtains a description "targetlevel="1-3"". By referring to this description, the page selection means 15 decides to select the pages having the levels 1 to 3 in the navigation. In this example, since the level of "newpage4" and "newpage5" in the navigation is 2, these pages are selected as pages to be included in the navigation. No page having level 3 exists in the navigation. Consequently, the pages to be selected are "newpage2", "newpage4," and "newpage5."

Thereafter, the page selection means 15 delivers information that the selected pages are "newpage2", "newpage4," and "newpage5," the page after insertion of the navigation tag and the site structure information to the structure information generation means 16.

Subsequently, the structure information generation means 16 generates navigation structure information (step 508).

More specifically, the structure information generation means 16 extracts a partial tree constituted by "newpage2," "newpage4," and "newpage5," from the site structure information delivered from the page selection means 15. Information such as the labels and paths of the pages are also included in "newpage2," "newpage4," and "newpage5," constituting the partial tree. Therefore this set of information will be referred to as "items."

Since in this example the navigation including links to the pages in a list form as shown in the section "Thumbnail" in FIG. 13 is made, the structure information generation means 16 converts the partial tree into structure information of a list structure in accordance with a predetermined rule. For example, the structure information generation means 16 makes a list structure including "newpage2," "newpage4," and "newpage5," in this order.

To each item are added attributes such as "level," indicating the level of the corresponding page in the navigation, and "self," indicating that the corresponding page is the current page, or "ancestor," indicating that the corresponding page is a lineal ancestor of the current page.

More specifically, attributes such as "level=0," "self=true," and "ancestor=false," are added to "newpage2"; attributes such as "level=1," "self=false," and "ancestor=false" are added to "newpage3"; and attributes such as "level=1," "self=false," and "ancestor=false" are added to "newpage4." While the level of the root is defined as level 1 on the user interface, the level of the root is defined as "level=0" in the computer.

When the structure information generation means 16 generates structure information of a list structure, it delivers the structure information to the navigation generation means 18.

The navigation generation means 18 generates the navigation on the basis of the structure information delivered from the structure information generation means 16 and the template stored in the template storage means 17. That is, the navigation generation means 18 executes the control structure described in the template on the basis of the structure information delivered from the structure information generation means 16, and obtains the navigation as its output.

Listing 1600 of FIG. 16 shows an example of the template. In this template, a portion to be output as a navigation is defined as a table (<table>~</table>). The contents of the table are executed with respect to each item contained in the structure information. In this template, case classification is made according to conditions which are combinations of the attributes added to the items. In this example, four cases are classified according to combinations of "level" and "self." A portion defined with respect to the condition satisfied by each item is output as the navigation.

Processing using this template will be described in more detail. The navigation generation means 18 first outputs a <table> tag 1601 and <tbody> tag 1602. Subsequently, the navigation generation means 18 processes a tag 1603-1606 portion by interpreting the tag 1603 and setting each item in a variable "item".

In this portion, the conditions according to the combinations of "level" and "self" are defined. That is, there is a case where "self=true" and "level=0", a case where "self=false" and "level=0", a case where "self=true" other than these cases, and the other case. Processing of this portion is performed with respect to each item and a <tr> element defined with respect to the condition satisfied by each item is extracted.

More specifically, processing is performed as described below. The navigation generation means 18 first processes the tag 1603-1606 portion by setting in variable "item" the first item "newpage2" in the structure information. Since "self=true" and "level=0" in "newpage2", the navigation generation means 18 outputs <tr> element 1604. At this time, "${item.label}" is replaced with the label of "newpage2", and "${item.href}" is replaced with the path of "newpage2."

Subsequently, the navigation generation means 18 processes the tag 1603-1606 portion by setting in variable "item" the second item "newpage4" in the structure information. Since neither of "self=true" and "level=0" is satisfied in "newpage4," the navigation generation means 18 outputs <tr> element 1605. At this time, "$ {item.label}" is replaced with the label of "newpage4", and "${item.href}" is replaced with the path of "newpage4."

Further, the navigation generation means 18 processes the tag 1603-1606 portion by setting in variable "item" the third item "newpage5" in the structure information. Since neither of "self=true" and "level=0" is satisfied in "newpage5," the navigation generation means 18 outputs <tr> element 1605. At this time, "${item.label}" is replaced with the label of "newpage5", and "${item.href}" is replaced with the path of "newpage5."

When the above-described processing is completed, there is no other item in the structure information and the navigation generation means 18 therefore outputs a </tbody> tag 1607 and a </table> tag 1608.

While in the above-described example, combinations of "self" and "level" are used as conditions, combinations including some other attribute, e.g., "ancestor," may be used as conditions to provide a finer navigation according to the attributes.

HTML 1700 of FIG. 17 shows the HTML source after the navigation has been automatically generated by the above-described processing. The navigation (<table> . . . </table>) output by the above-described processing is inserted between the navigation tag start tag "<!--siteedit:navbar . . . -->" and the end tag "<!--/siteedit:navbar-->".

Figure 18:
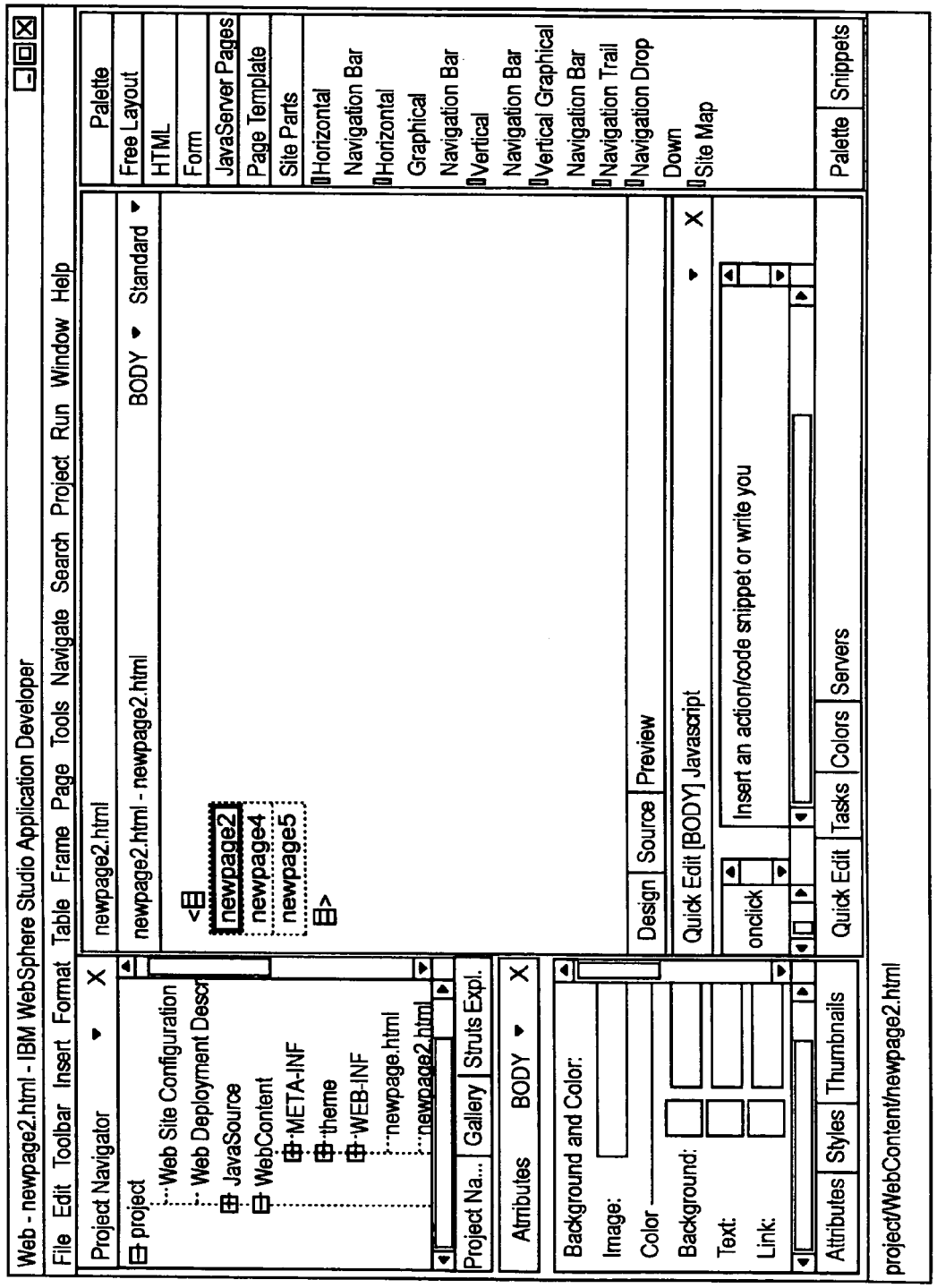
FIG. 18 is a diagram showing an example of an on-screen display on the editor in the exemplary embodiment.

FIG. 18 shows an example of the on-screen display on the editor at this time. In this on-screen display, a navigation display image including links to "newpage2," "newpage4," and "newpage5" is output between an icon indicating the navigation tag start tag and an icon indicating the end tag.

Also, in the case of insertion of a navigation in "newpage3," the same processing as that described above is performed to generate a navigation including links to "newpage3," "newpage6," and "newpage7."

Figure 19:
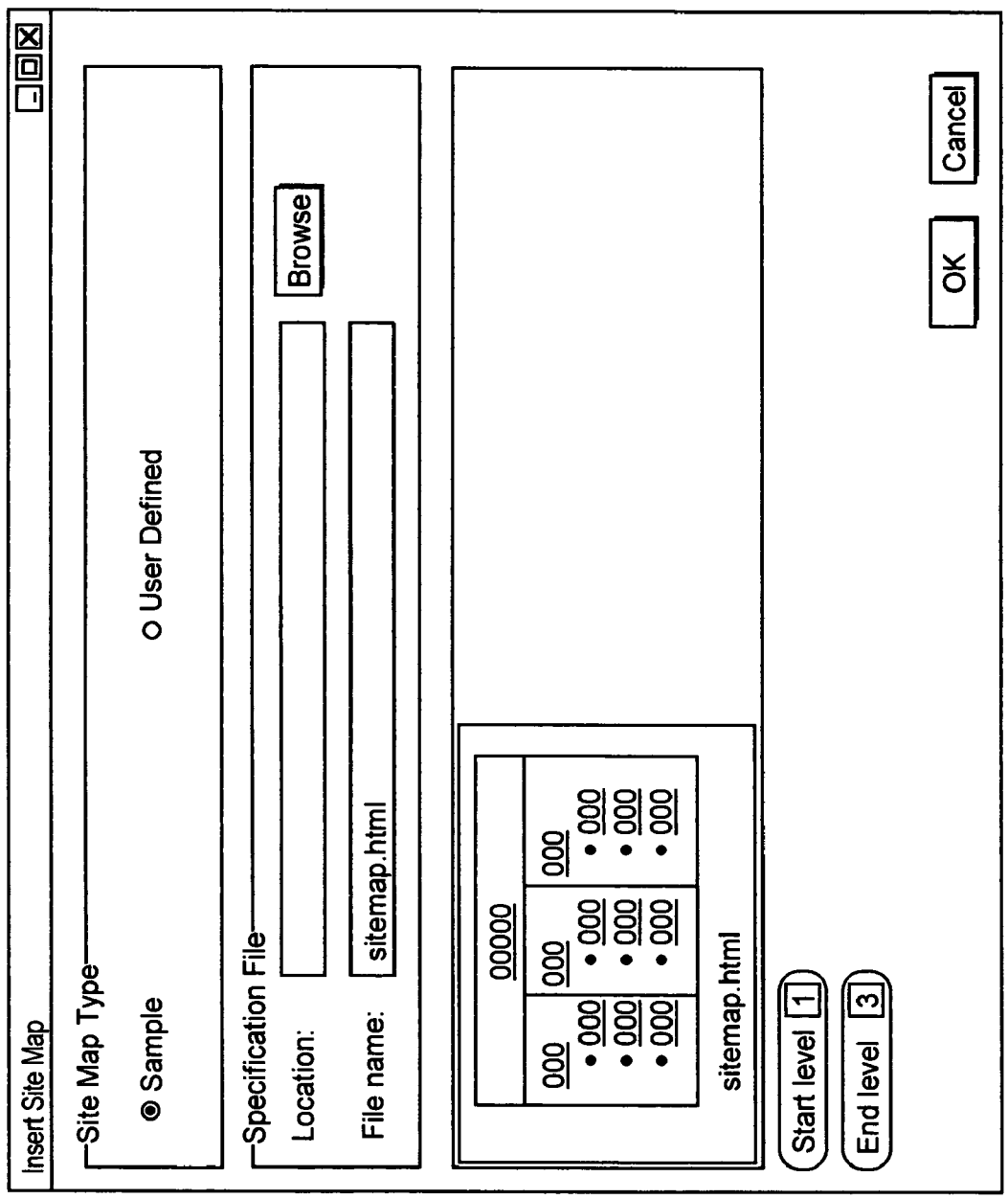
FIG. 19 is a diagram showing an example of a navigation tag insertion dialog in the exemplary embodiment.

A template such as one in a preview display in a navigation insertion tag dialog shown in FIG. 19 may be used as well as that described above.

While the template shown in FIG. 13 may be used for making a navigation by using structure information of a list structure, the template shown in FIG. 19 may be used for making a navigation by using structure information of a tree structure.

The operation when a navigation is automatically made by using the template shown in FIG. 19 will be concretely described with respect to a case where the navigation is formed on "newpage."

The page selection means 15 first identifies the position of the current page by referring to the site structure information stored in the site structure storage means 11 (step 501). Since in this example the navigation will be inserted in "newpage," the page selection means 15 identifies the position of "newpage." Subsequently, the page selection means 15 determines whether or not "newpage" is a top page (step 502). Since in this example "newpage" is a top page, the level of "newpage" in the navigation is set to 1 (step 505). At this time, the levels of "newpage2" and "newpage3," which are child pages of "newpage," are set to 2 in the navigation, and the levels of "newpage4" and "newpage5," which are child pages of "newpage2" and the levels "newpage6" and "newpage7," which are child pages of "newpage3," are set to 3 in the navigation.

Subsequently, the page selection means 15 obtains page selection information from the navigation tag written in the page delivered from the navigation tag insertion means 14 (step 506). More specifically, the page selection means 15 obtains a description "targetlevel="1-3"". By referring to this description, the page selection means 15 decides to select the pages having the levels 1 to 3 in the navigation. In this example, since the level of "newpage2" and "newpage3" in the navigation is 2, these pages are selected as pages to be included in the navigation. Also, since the level of "newpage4", "newpage5", "newpage6" and "newpage7" in the navigation is 3, these pages are also selected as pages to be included in the navigation. Consequently, the pages to be selected are "newpage," "newpage2," "newpage3," "newpage4," "newpage5," "newpage6," and "newpage7."

Thereafter, the page selection means 15 delivers information that the selected pages are "newpage," "newpage2," "newpage3," "newpage4," "newpage5," "newpage6," and "newpage7," the page after insertion of the navigation tag and the site structure information to the structure information generation means 16.

Subsequently, the structure information generation means 16 generates navigation structure information (step 508).

More specifically, the structure information generation means 16 extracts a partial tree constituted by "newpage," "newpage2," "newpage3," "newpage4," "newpage5," "newpage6," and "newpage7" from the site structure information delivered from the page selection means 15.

Since in this example the navigation including links to the pages in a tree-structure form as shown in the section "Thumbnail" in FIG. 19 is made, the structure information generation means 16 directly sets the partial tree as structure information of a tree structure.

To each item may be added attributes such as "level," indicating the level of the corresponding page in the navigation, and "self," indicating that the corresponding page is the current page, or "ancestor," indicating that the corresponding page is a lineal ancestor of the current page, as in the case where the temperate shown in FIG. 13 is used.

When the structure information generation means 16 generates structure information of a tree structure, it delivers the structure information to the navigation generation means 18.

The navigation generation means 18 generates the navigation on the basis of the structure information delivered from the structure information generation means 16 and the template stored in the template storage means 17. That is, the navigation generation means 18 executes the control structure described in the template on the basis of the structure information delivered from the structure information generation means 16, and obtains the navigation as its output.

FIG. 20 shows an example of the template 2000. This template enables making of a navigation with high degree of freedom in such a manner that the existence/nonexistence of child nodes in the tree structure and the number of child nodes are set in conditions for case classification in the control structure and the values of tag attributes to be output.

Processing using this template will be described in more detail. The navigation generation means 18 first processes a tag 2001-2021 portion by interpreting a tag 2001 and setting in a variable "top" the first item "newpage" in the structure information.

That is, the navigation generation means 18 first outputs <table> tag 2002, <tbody> tag 2003, <tr> element 2004, and <tr> tag 2005. At this time, "${top.childcount}" is replaced with the number of nodes as children (hereinafter referred to as "child nodes") of "newpage," and "$ {top.item.href} " is replaced with the path of "newpage."

Subsequently, the navigation generation means 18 processes a tag 2006-2017 portion by interpreting tag 2006 and setting in a variable "node" the first child node "newpage2" of "newpage" in the structure information.

That is, the navigation generation means 18 first outputs <td> tag 2007 and <a> element 2008. At this time, "$ {node.item.label}" is replaced with the label of "newpage2," and "$ {node.item.href} " is replaced with the path of "newpage2."

Subsequently, the navigation generation means 18 interprets tag 2009 and processes a tag 2009-2015 portion since child nodes of "newpage2" exist.

That is, the navigation generation means 18 first outputs <ul> tag 2010.

Subsequently, the navigation generation means 18 interprets tag 2011, sets in a variable "node2" the first child node "newpage4" of "newpage2" in the structure information, and outputs <li> element 2012. At this time, "${node2.item.label}" is replaced with the label of "newpage4," and "$ {node2.item.href}" is replaced with the path of "newpage4." Also, the navigation generation means 18 sets in variable "node2" the second child node "newpage5" of "newpage2" in the structure information, and outputs <li> element 2012. At this time, "$ {node2.item.label}" is replaced with the label of "newpage5," and "$ {node2.item.href}" is replaced with the path of "newpage5."

When this processing is completed, there is no other child node of "newpage2" and the navigation generation means 18 therefore outputs a </ul> tag 2014 and </td> tag 2016.

Subsequently, the navigation generation means 18 sets the second child node "newpage3" of "newpage" in the variable "node" and processes the tag 2006-2017 portion in the same manner.

When this processing is completed, there is no other child node of "newpage" and the navigation generation means 18 therefore outputs a </tr> tag 2018, </tbody> tag 2019 and a </table> tag 2020.

FIG. 21 shows the HTML source 2100 after the navigation has been automatically generated by the above-described processing. The navigation (<table> . . . </table>) output by the above-described processing is inserted between the navigation tag start tag "<!--siteedit:navbar . . . --" and the end tag "<!--/siteedit:navbar-->".

Figure 22:
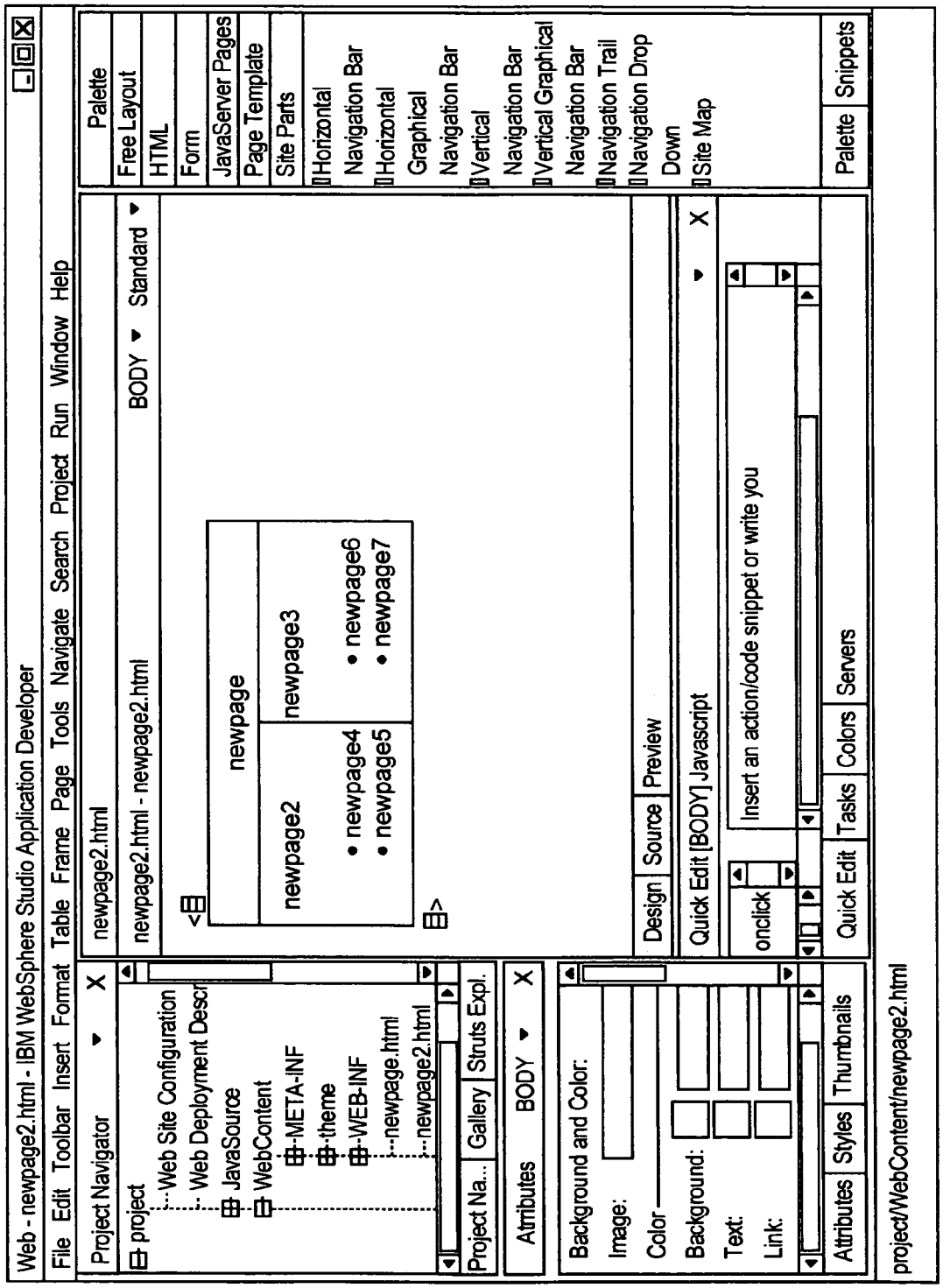
FIG. 22 is a diagram showing an example of an on-screen display on the editor in the exemplary embodiment.

FIG. 22 shows an example of the on-screen display on the editor at this time. In this on-screen display, a navigation display image is output between an icon indicating the navigation tag start tag and an icon indicating the end tag.

In the above description, no mention has been made of the method of determination as to whether the structure information generation means 16 generates structure information of a list structure or structure information of a tree structure, because the structure information generation means 16 may be arranged to generate only structure information of a list structure in a system in which only templates using structure information of a list structure are prepared, and because the structure information generation means 16 may be arranged to generate only structure information of a tree structure in a system in which only templates using structure information of a tree structure are prepared.

However, a system in which both templates using structure information of a list structure and templates using structure information of a tree structure is conceivable. In such a case, an attribute as to whether structure information of a list structure or structure information of a tree structure is used may be defined in templates, and the structure information generation means 16 may determine the generation of one of the two sorts of structure information on the basis of the attribute defined in the selected template. Alternatively, the structure information generation means 16 may generate both structure information of a list structure and structure information of a tree structure regardless of the kind of the selected template.

In this embodiment, a function for changing the navigation setting made by using the navigation tag insertion dialog shown in FIG. 13 or 19 is also provided. The navigation setting may be changed before or after the automatic navigation making shown in FIG. 5. In a case where the setting is changed after automatic navigation making, however, automatic navigation making is again performed to make a navigation in which a change in setting is reflected.

Figure 23:
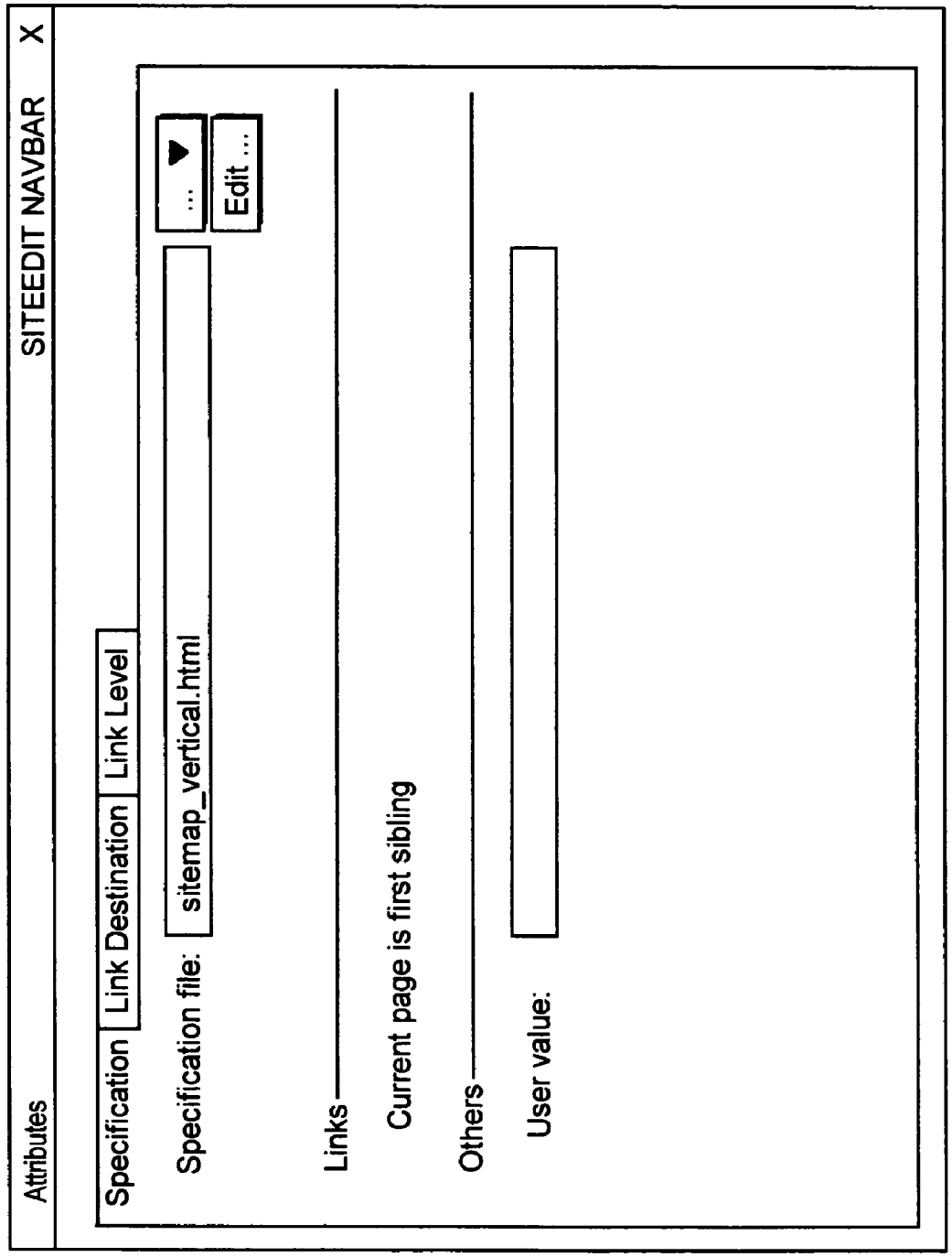
FIG. 23 is a diagram showing a navigation setting change dialog in the exemplary embodiment.

Processing for changing the navigation setting will be concretely described. FIG. 23 shows a dialog for changing the name of a file used as a template for a navigation and for adding a setting of a page display sequence included in a navigation. The latter setting is performed by checking "Current page is first sibling" to enable the self-page to be displayed at the highest position among sibling pages in a navigation. When such a setting is made, a description ("topsibling="true" ") representing this setting is written in the navigation tag.

If such a description exists, the structure information generation means 16 performs such processing that the self-page is displayed in the highest position among sibling pages at the time of generation of structure information in step 508.

Figure 24:
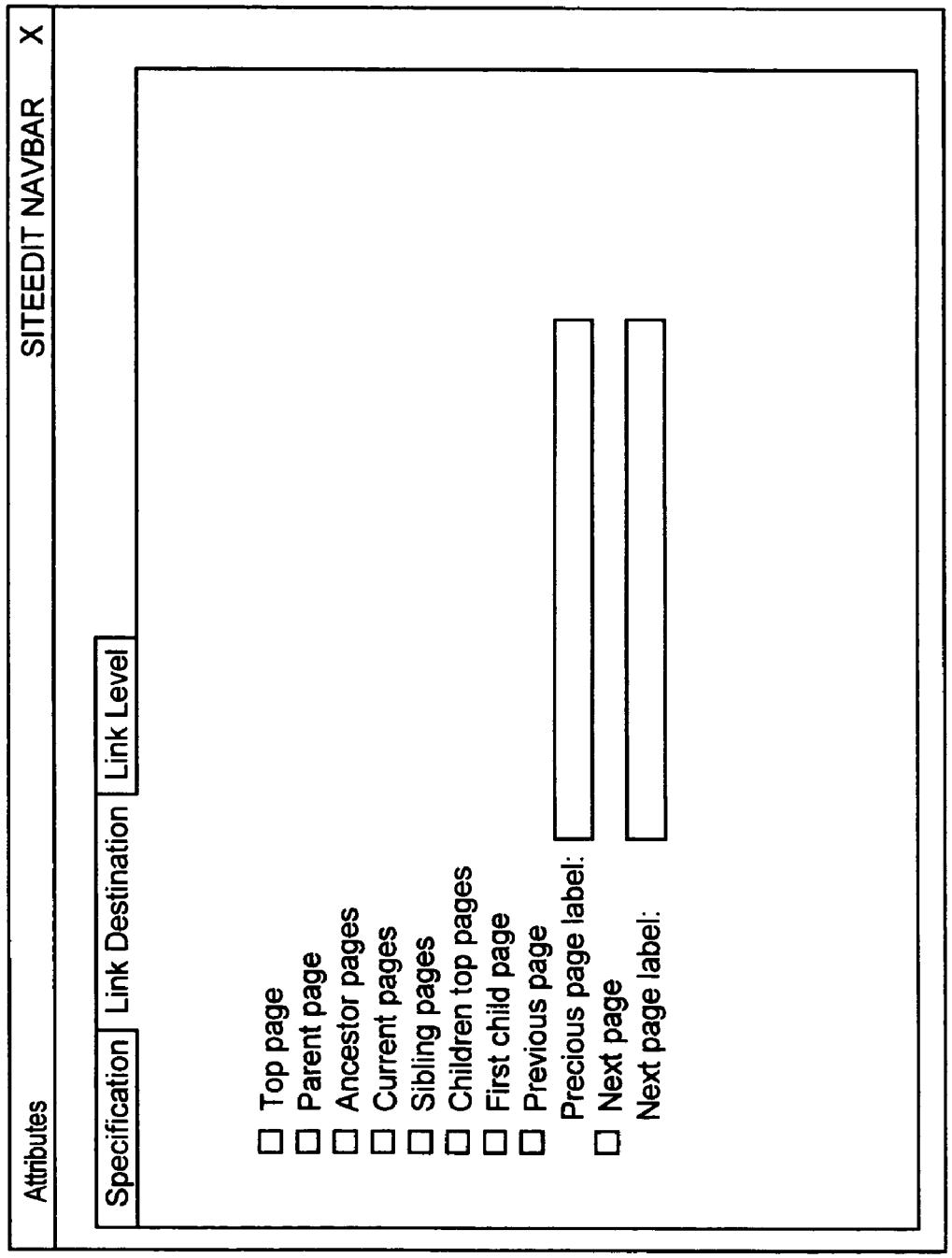
FIG. 24 is a diagram showing a navigation setting change dialog in the exemplary embodiment.

FIG. 24 shows a dialog for adding a setting for designating a page in a navigation according to a relative relationship with the self-page.

More specifically, a setting for including a top page in a site structure in a navigation can be made by checking "Top page." A setting for including a parent page of the self-page in a navigation can be made by checking "Parent page." A setting for including ancestor pages (parent page, grandfather page, great-grandfather page and so on) in a navigation can be made by checking "Ancestor pages." A setting for including the self-page in a navigation can be made by checking "Current page." A setting for including children pages of the self-page in a navigation can be made by checking "Children pages." A setting for including sibling pages of the self-page in a navigation can be made by checking "Sibling pages." A setting for including children pages of the top page in a navigation can be made by checking "Children of top page." A setting for including an eldest-son (first child) page of the self-page in a navigation can be made by checking "First child page." A setting for including an immediate preceding page (next older brother page) of the self-page in a navigation can be made by checking "Previous page." A setting for including a next page (next younger brother page) to the self-page in a navigation can be made by checking "Next page."

If such a setting is made, a description representing the setting is written in the navigation tag and the page selection means 15 makes a selection in step 507 while combining the page designated by the setting.

Figure 25:
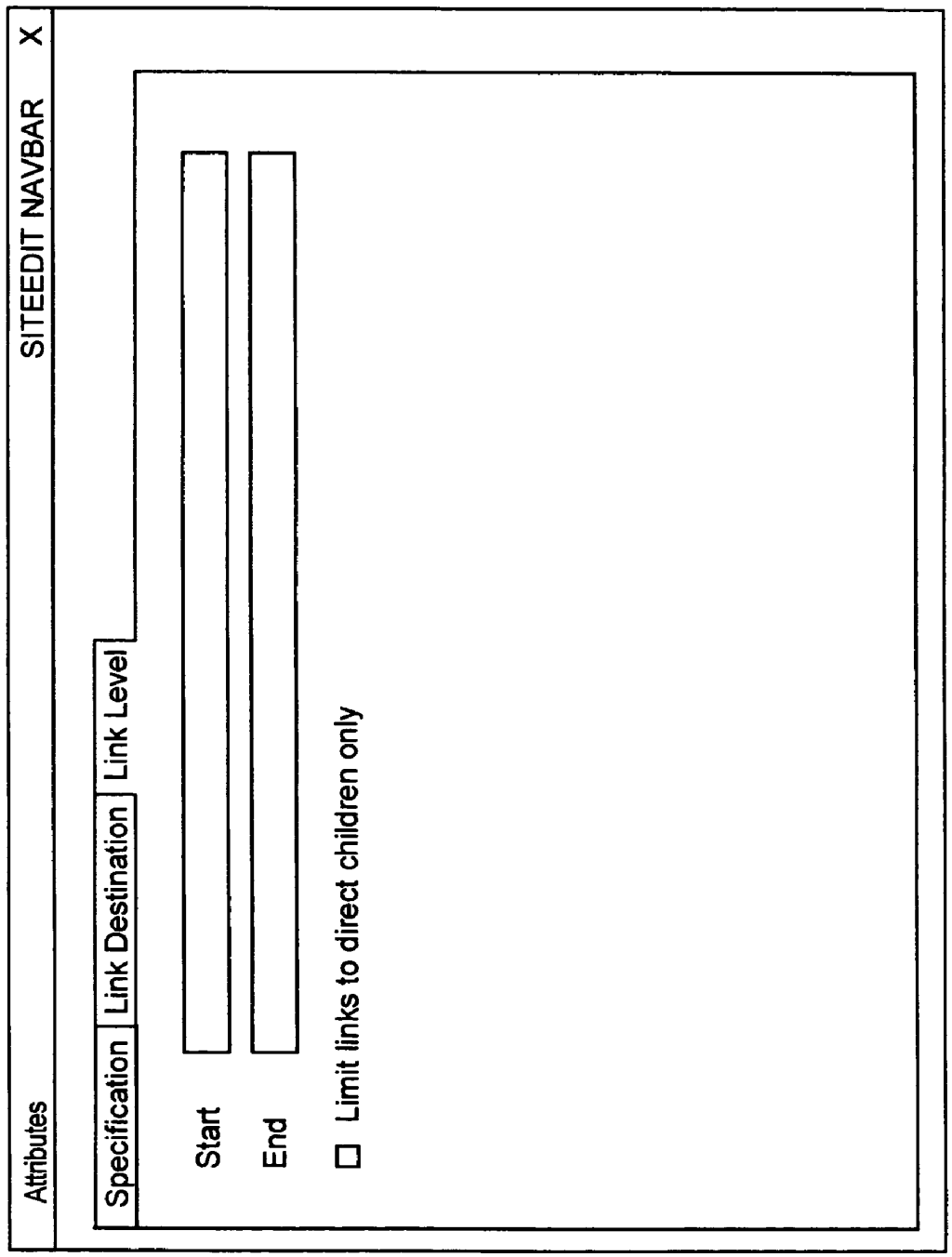
FIG. 25 is a diagram showing a navigation setting change dialog in the exemplary embodiment.

FIG. 25 is a dialog for changing a setting of the start level and end level for pages to be included in a navigation and for adding a setting for limiting pages included in a navigation to lineal ancestors and descendants. The latter setting is made by checking "Limit links to direct children only." A description representing this setting is written in the navigation tag and the page selection means 15 performs processing for excluding pages other than the lineal ancestors and descendants at the time of page selection in step 507.

In the dialogs shown in FIGS. 23 to 25, a number of settings not set in the navigation tag insertion dialog shown in FIG. 13 or 19 are added. However, it is not necessarily required that these settings be made at the time of setting change. These settings may be made when a navigation setting is made by using the navigation tag insertion dialog shown in FIG. 13 or 19.

The operation of the exemplary embodiment has been described. In this embodiment, the navigation tag insertion means 14 reads out from the page storage means 13 a page description of a page on which a navigation is to be made, and each of the navigation tag insertion means 14, the page selection means 15 and the structure information generation means 16 does not write the description back to the page storage means 13, but the navigation generation means 18 finally writes the description back to the page storage means 13. However, the arrangement may alternatively be such that each of the navigation tag insertion means 14, the page selection means 15, and the structure information generation means 16 reads out the description at the time of starting its processing and writes the description back to the page storage means 13 after finishing the processing.

While in the described arrangement the page selection means 15 reads out site structure information from the site structure storage means 11 and directly delivers the read information to the structure information generation means 16, the arrangement may alternatively be such that the structure information generation means 16 again reads out the site structure information from the site structure storage means 11 without receiving the information from the page selection means 15.

In this embodiment, as described above, a navigation including links to pages contained in any partial tree of the tree structure of a web site and information indicating the positions of the pages is generated. Thus, a navigation closed around a particular group of pages in a web site and easy to understand can be generated.

Also in this embodiment, a template in which a style is defined according to each of positions in an ordinary partial tree to determine a style for a link to a page contained in a particular partial tree, thus enabling use of a common template.

We claim:

1. A method for generating a web site navigation, the method comprising:
   receiving designation of a specific web page contained in a web site having a tree structure of web pages, every node in the tree structure representing an individual web page of the web site;
   setting the specific web page as a navigation root for a partial tree of the web site;
   automatically generating the navigation comprising at least one link to a web page of the web site as the partial tree of the web site in which the specific web page is designated as the navigation root of the partial tree of the web site,
   the navigation comprising a displayed partial site map comprising the partial tree of the web site; and
   setting the navigation root to indicate a distinction for purposes of a style of display of the at least one link to the web page of the navigation between the partial tree having the specific web page as the navigation root and at least one other portion of the web site, the style of display of the at least one link being based on a position in the partial tree;
   wherein the tree structure is represented by extensible markup language (XML) and information of the navigation root is inserted by an XML tag.

2. The method of claim 1, further comprising:
   selecting at least one web page in the partial tree to be displayed in the navigation; and
   generating the navigation including at least one link to the selected web page and information indicating a position of the selected web page in the partial tree.

3. The method of claim 2, wherein the partial tree is a portion of the tree structure comprising a lowest level root among partial trees containing the selected web page.

4. The method of claim 2, wherein the scope of the selected web page in the selecting step is determined by a level in the tree structure.

5. The method of claim 2, wherein the navigation is generated using a template.

6. A computer readable storage device having machine readable program codes for causing a computer system to:
   receive designation of a specific web page contained in a web site having a tree structure of web pages, every node in the tree structure representing an individual web page of the web site;
   set the specific web page as a navigation root for a partial tree of the web site;
   automatically generate a navigation comprising at least one link to a web page of the web site as the partial tree of the web site in which the specific web page is designated as the navigation root of the partial tree of the web site,
   the navigation comprising a displayed partial site map comprising the partial tree of the web site; and
   set the navigation root to indicate a distinction for purposes of a style of display of the at least one link to the web page of the navigation between the partial tree having the specific web page as the navigation root and at least one other portion of the web site,
   the style of display of the at least one link being based on a position in the partial tree;

wherein the tree structure is represented by extensible markup language (XML) and information of the navigation root is inserted by an XML tag.

7. The computer readable storage device of claim 6, further comprising program codes for causing the computer system to:
    select at least one web page in the partial tree to be displayed in the navigation; and
    generate the navigation including at least one link to the selected web page and information indicating a position of the selected web page in the partial tree.

8. The computer readable storage device of claim 7, wherein the partial tree is a portion of the tree structure comprising a lowest level root among partial trees containing the selected web page.

9. The computer readable storage device of claim 7, wherein the scope of the selected web page in the selecting step is determined by a level in the tree structure.

10. The computer readable storage device of claim 7, wherein the navigation is generated using a template.

11. The method of claim 1, where setting the navigation root to indicate the distinction for purposes of the style of display of the at least one link to the web page of the navigation between the partial tree and the at least one other portion of the web site comprises:
    setting the navigation root based upon a template that defines a style according to each of a plurality of positions in the partial tree to determine the style of display of the at least one link to the web page.

12. The method of claim 1, where automatically generating the navigation comprises automatically generating an extensible markup language (XML) file as the navigation and displaying the navigation using the automatically generated XML file as the displayed site map of the web site.

13. The method of claim 12, further comprising: inserting, in response to detection of a user input selection, a navigation tag into the XML file, where the navigation tag comprises a target level indication of a number of levels of the navigation, and a name indication of an XML template file used as a template for the navigation.

14. The computer readable storage device of claim 6, where the program codes for causing the computer system to set the navigation root to indicate the distinction for purposes of the style of display of the at least one link to the web page of the navigation between the partial tree and the at least one other portion of the web site comprises program codes for causing the computer system to:
    set the navigation root based upon a template that defines a style according to each of a plurality of positions in the partial tree to determine the style of display of the at least one link to the web page.

15. The computer readable storage device of claim 6, where the program codes for causing the computer system to automatically generate the navigation comprises program codes for causing the computer system to automatically generate an extensible markup language (XML) file as the navigation and display the navigation using the automatically generated XML file as the displayed site map of the web site.

16. A method for generating a web site navigation, the method comprising:
    receiving designation of a specific web page contained in a web site having a tree structure of web pages, every node in the tree structure representing an individual web page of the web site;
    setting the specific web page as a navigation root for a partial tree of the web site;
    automatically generating the navigation comprising an extensible markup language (XML) file designating at least one link to a web page of the web site as the partial tree of the web site in which the specific web page is designated as the navigation root of the partial tree of the web site, the navigation comprising a partial site map comprising the partial tree of the web site represented in XML;
        displaying the navigation using the automatically generated XML file; and
    setting the navigation root to indicate a distinction for purposes of a style of display of the at least one link to the web page of the navigation between the partial tree and at least one other portion of the web site,
    the style of display of the at least one link being based on a position in the partial tree
        wherein the tree structure is represented by XML and information of the navigation root is inserted by an XML tag.

17. The method of claim 16, where setting the navigation root to
    indicate the distinction for purposes of the style of display of the at least one link to the web page of the navigation between the partial tree and the at least one other portion of the web site comprises:
    setting the navigation root based upon a template that defines a style according to each of a plurality of positions in the partial tree to determine the style of display for the at least one link to the web page.

18. The method of claim 16, further comprising: inserting, in response to detection of a user input selection, a navigation tag into the XML file, where the navigation tag comprises a target level indication of a number of levels of the navigation, and a name indication of an XML template file used as a template for the navigation.

* * * * *